United States Patent
Nakano et al.

(10) Patent No.: US 11,848,727 B2
(45) Date of Patent: Dec. 19, 2023

(54) WIRELESS COMMUNICATION SYSTEM AND WIRELESS COMMUNICATION METHOD

(71) Applicant: NIPPON TELEGRAPH AND TELEPHONE CORPORATION, Tokyo (JP)

(72) Inventors: Marina Nakano, Musashino (JP); Yosuke Fujino, Musashino (JP); Hiroyuki Fukumoto, Musashino (JP); Kazunori Akabane, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 130 days.

(21) Appl. No.: 17/634,207

(22) PCT Filed: Aug. 13, 2019

(86) PCT No.: PCT/JP2019/031861
§ 371 (c)(1),
(2) Date: Feb. 9, 2022

(87) PCT Pub. No.: WO2021/029015
PCT Pub. Date: Feb. 18, 2021

(65) Prior Publication Data
US 2022/0321182 A1 Oct. 6, 2022

(51) Int. Cl.
*H04K 1/00* (2006.01)
*H04L 27/28* (2006.01)
(Continued)

(52) U.S. Cl.
CPC ......... *H04B 7/0456* (2013.01); *H04B 7/0632* (2013.01); *H04W 28/0242* (2013.01); *H04W 28/0284* (2013.01)

(58) Field of Classification Search
CPC .. H04B 7/0456; H04B 7/0632; H04B 7/0854; H04B 7/028; H04B 7/0413;
(Continued)

(56) References Cited

U.S. PATENT DOCUMENTS 10,305,560 B2 * 5/2019 Adachi ................. H01Q 19/17
10,862,553 B1 * 12/2020 Kim ...................... H04L 1/0003
(Continued)

OTHER PUBLICATIONS

Tsuguo Maru et al., "Line-of-Sight MIMO Transmission for Achieving High Capacity Fixed Point Microwave Radio Systems", WCNC2008, IEEE, 2008, pp. 1137-1142.
(Continued)

*Primary Examiner* — Phuong Phu
(74) *Attorney, Agent, or Firm* — Harness, Dickey & Pierce, P.L.C.

(57) ABSTRACT

A plurality of transmit antennas of a radio transmission device and a plurality of receive antennas of a radio reception device are located under the sea that is a line-of-sight environment, wherein the radio transmission device selects a frequency channel to be used based on an index value per frequency channel indicating orthogonality between the transmit and receive antennas defined based on a distance between the transmit and receive antennas and an angle indicating a direction of arrival of a radio signal, an interval between the plurality of transmit antennas, an interval between the plurality of receive antennas, and a modulation scheme, the distance between the transmit and receive antennas and the angle indicating the direction of arrival of the radio signal estimated by the radio reception device, and a desired bit error rate to be predetermined, selects the modulation scheme for providing a maximum transmission capacity per the selected frequency channel, separates transmission data into a plurality of pieces of transmission data the number of which corresponds to the number of fre- (Continued)

quency channels, modulates each of the plurality of pieces of transmission data separated in accordance with the selected modulation scheme, and outputs a transmission signal obtained by multiplexing, with a multiplexing order, each of the plurality of pieces of transmission data, the multiplexing order indicating the number of transmit antennas of the plurality of transmit antennas to be used.

4 Claims, 15 Drawing Sheets

(51) Int. Cl.
*H04B 7/0456* (2017.01)
*H04B 7/06* (2006.01)
*H04W 28/02* (2009.01)

(58) Field of Classification Search
CPC ......... H04W 28/0242; H04W 28/0284; H01Q 19/17; H04L 1/0003; H04L 27/02; G02F 1/1333
USPC ................................ 375/260, 267, 299, 347
See application file for complete search history.

(56) References Cited

U.S. PATENT DOCUMENTS

| | | | |
|---|---|---|---|
| 2010/0135203 A1* | 6/2010 | Maru | H04B 7/0854 370/328 |
| 2011/0075081 A1* | 3/2011 | Ishida | G02F 1/1333 349/123 |
| 2011/0075747 A1* | 3/2011 | Mihota | H04B 7/0413 375/260 |
| 2011/0098010 A1* | 4/2011 | Mihota | H04L 27/02 455/101 |
| 2018/0309481 A1* | 10/2018 | Wu | H04B 7/028 |

OTHER PUBLICATIONS

Toshihisa YAMADA et al., "A Consideration on Performance Evaluation of Linear/Rectangular Array LOS-MIMO Systems", IEICE Technical Report, CS2015-55, (Nov. 2015), pp. 59-64.

* cited by examiner

121; TRANSMISSION SCHEME LOOKUP TABLE

| DISTANCE [m] | 10 | ANGLE [DEGREE] | 30 | | |
|---|---|---|---|---|---|
| | TRANSMISSION SCHEME A "TRANSMISSION RATE MAXIMUM" | TRANSMISSION SCHEME B "TRANSMISSION RATE HIGH" | TRANSMISSION SCHEME C "TRANSMISSION RATE MEDIUM" | TRANSMISSION SCHEME D "TRANSMISSION RATE LOW" | |
| $f_0$ [Hz] | POOR | POOR | FAIR | FAIR | |
| $f_1$ [Hz] | POOR | FAIR | GOOD | GOOD | |
| $f_2$ [Hz] | FAIR | GOOD | GOOD | GOOD | |
| $f_3$ [Hz] | FAIR | FAIR | GOOD | GOOD | |
| $f_4$ [Hz] | POOR | POOR | FAIR | GOOD | |
| $f_5$ [Hz] | POOR | | | | |

121-1; TRANSMISSION SCHEME LOOKUP TABLE
121-2
121-3
121-X

Fig. 2

122: CHANNEL CAPACITY TABLE

| | $x_1$ [m] | $x_2$ [m] | $x_3$ [m] | $x_4$ [m] |
|---|---|---|---|---|
| $f_0$ [Hz] | 10.5 [bps/Hz] | 9.5 [bps/Hz] | 7.0 [bps/Hz] | 8.5 [bps/Hz] |
| $f_1$ [Hz] | 9.0 [bps/Hz] | 7.0 [bps/Hz] | 9.0 [bps/Hz] | 11.0 [bps/Hz] |
| $f_2$ [Hz] | 7.5 [bps/Hz] | 9.0 [bps/Hz] | 10.0 [bps/Hz] | 9.0 [bps/Hz] |
| $f_3$ [Hz] | 9.5 [bps/Hz] | 11.0 [bps/Hz] | 9.0 [bps/Hz] | 7.5 [bps/Hz] |
| $f_4$ [Hz] | 11.0 [bps/Hz] | 9.0 [bps/Hz] | 9.5 [bps/Hz] | 7.0 [bps/Hz] |
| $f_5$ [Hz] | 10.0 [bps/Hz] | 9.5 [bps/Hz] | 7.5 [bps/Hz] | 8.5 [bps/Hz] |
| AVERAGE Ch CAPACITY | 9.6 [bps/Hz] | 9.2 [bps/Hz] | 8.7 [bps/Hz] | 8.6 [bps/Hz] |
| MAXIMUM GUARANTEED TRANSMISSION SCHEME | TRANSMISSION SCHEME A "TRANSMISSION RATE MAXIMUM" | TRANSMISSION SCHEME B "TRANSMISSION RATE HIGH" | TRANSMISSION SCHEME B "TRANSMISSION RATE HIGH" | TRANSMISSION SCHEME C "TRANSMISSION RATE MEDIUM" |

Fig. 11

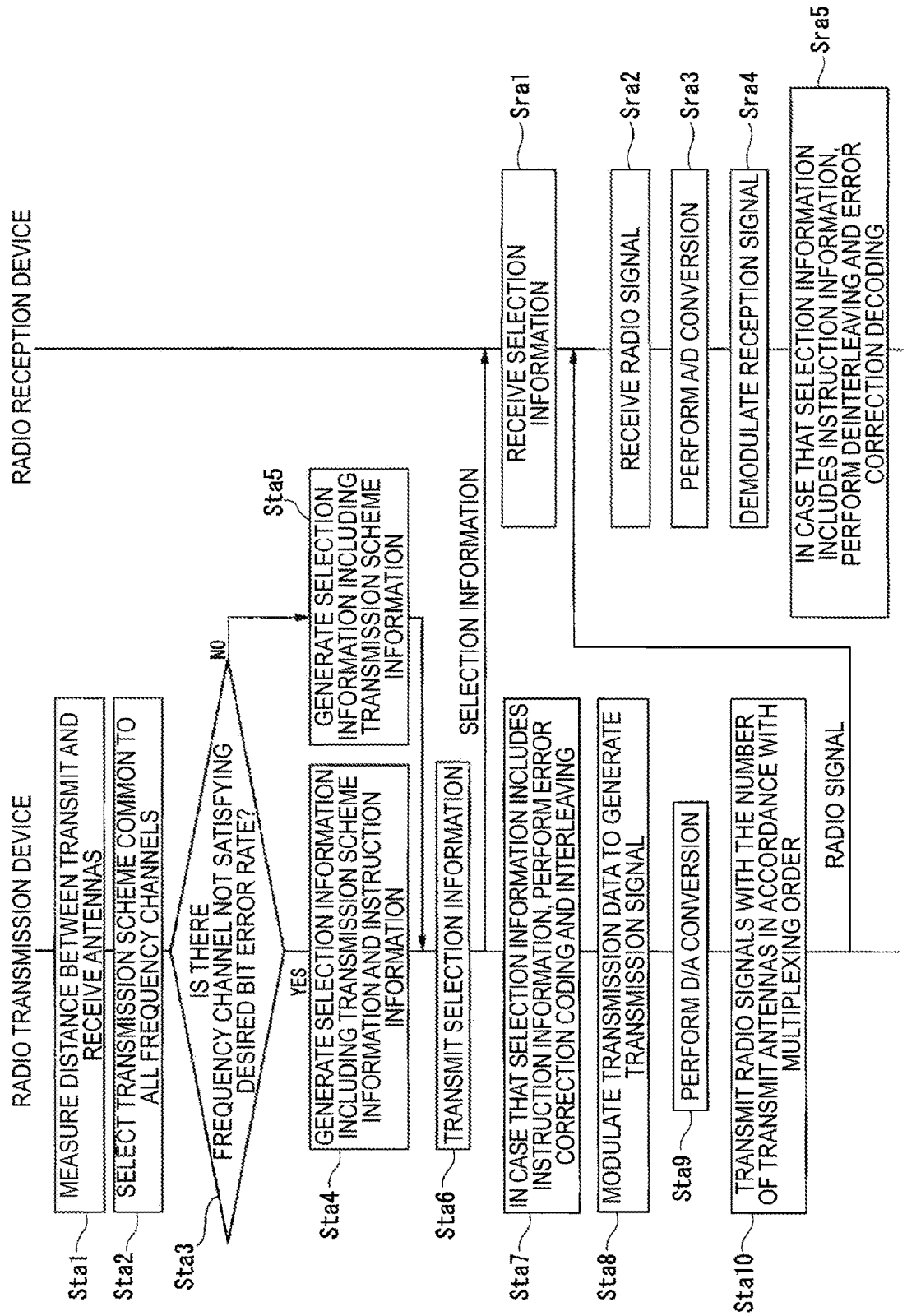

WIRELESS COMMUNICATION SYSTEM AND WIRELESS COMMUNICATION METHOD

CROSS-REFERENCE TO RELATED APPLICATIONS

This application is a 371 U.S. National Phase of International Application No. PCT/JP2019/031861 filed on Aug. 13, 2019. The entire disclosure of the above application is incorporated herein by reference.

TECHNICAL FIELD

The present invention relates to a radio communication system and a radio communication method.

BACKGROUND ART

In recent years, the spatial multiplexing technology has often been used to increase the capacity of communications. In an environment where multipath exits, for example, spatial multiplexing is feasible by utilizing multiple-input multiple-output (MIMO) techniques with multipath signals taken into consideration and forming parallel transmission paths. In contrast, in a case where communication is performed at very high frequency such as millimeter waves, the use of multipath signals is difficult, so the line-of-sight multiple-input multiple-output (LoS-MIMO) technique for spatial multiplexing in a line-of-sight environment is utilized (for example, see NPDs 1 and 2).

Common MIMO premises communication in a non-line-of-sight environment, implementing parallel transmission paths with a multipath including a reflection wave from an obstacle to achieve an increase in transmission capacity. In the line-of-sight environment, the effect of increasing the transmission capacity of MIMO is lost. In contrast, in LoS-MIMO, parallel transmission paths are formed in which a distance between transmit and receive antennas, a transmit antenna interval, and a receive antenna interval satisfy a certain geometric condition and are orthogonal to one another. Thus, even in the line-of-sight environment, a high channel capacity by spatial multiplexing transmission can be achieved.

For example, as illustrated in FIG. 16, it is assumed that two transmit antennas 304-1 and 304-2, and two receive antennas 401-1 and 401-2 are placed in a line-of-sight environment. In this case, it is assumed that a relationship expressed by Equation (1) below is established between a distance D between the transmit and receive antennas, an interval d between the transmit antennas 304-1 and 304-2, and the interval d between the receive antennas 401-1 and 401-2.

[Math. 1]

$$d = \sqrt{\frac{\lambda R}{2}} \quad (1)$$

In Equation (1), "$\lambda$," represents a wavelength of a radio signal. In a case where the relationship of Equation (1) is established, for example, since two radio signals arriving, from two transmit antennas 304-1 and 304-2, at one receive antenna 401-1 have a path length difference of one fourth of the wavelength $\lambda$, and are orthogonal to each other, the parallel transmission paths can be formed.

FIG. 17 is a block diagram illustrating an example of a configuration of a radio communication system 500 using the LoS-MIMO technique. LoS-MIMO is often utilized for inter-site communications utilizing millimeter waves, etc. Thus, before transmission of data, a coding rate, multiplexing order, and modulation level are selected in a transmission signal generation unit 301 included in a radio transmission device 300. In general, the same coding rate, the same modulation level, and the same multiplexing order are used in LoS-MIMO.

CITATION LIST

Non Patent Document

NPD 1: T. Maru, M. Kawai, E. Sasaki, and S. Yoshida, "Line-of-Sight MIMO Transmission for Achieving High Capacity Fixed Point Microwave Radio Systems", WCNC2008, IEEE, 2008, pp. 1137-1142

NPD 2: Toshihisa Yamada, Daisuke Umehara, Kouichiro Wakasugi, and Takanori Wakamatsu, "A Consideration on Performance Evaluation of Linear/Rectangular Array LOS-MIMO Systems", IEICE technical report, the Institute of Electronics, Information and Communication Engineers, CS2015-55 (2015-11), pp. 59-64

SUMMARY OF THE INVENTION

Technical Problem

In recent years, with advancement in expansion of communication areas, radio communication using acoustic waves that are a type of radio under the sea has been under study. An undersea environment can be said to be a line-of-sight environment with less obstacle, and it is an environment suitable for applying the LoS-MIMO technique like the millimeter waves.

In LoS-MIMO, transmit antennas 304-1 to 304-M and receive antennas 401-1 to 401-N are placed to achieve the geometric condition of Equation (1) above such that orthogonality of the transmission paths is produced. Due to this condition, LoS-MIMO has the characteristics that the channel capacity varies greatly as the distance D between the transmit and receive antennas changes, as illustrated in the graph in FIG. 18.

Therefore, in applications such as the use during moving undersea like undersea communication, the distance D between the transmit and receive antennas changes over time, and the orthogonality of the transmission paths is broken and the channel capacity greatly changes. Therefore, the parallel transmission paths become difficult to form, and it disadvantageously becomes difficult to increase the transmission capacity by the spatial multiplexing transmission.

In light of the foregoing, the present invention has an object to provide a technology capable of maintaining formation of parallel transmission paths in spatial multiplexing transmission and increasing transmission capacity, even when a distance between transmit and receive antennas changes.

Means for Solving the Problem

An aspect of the present invention is a radio communication system including a radio transmission device including a plurality of transmit antennas; and a radio reception device including a plurality of receive antennas, wherein the radio reception device includes a demodulation unit configured to demodulate a reception signal received by each of the plurality of receive antennas in accordance with a demodulation scheme corresponding to a modulation scheme selected by the radio transmission device, to generate reception data, and an estimation unit configured to estimate, based on the reception signal, a distance between the transmit antenna and the receive antenna and an angle indicating a direction of arrival of a radio signal, and the radio transmission device includes a selection unit configured to select a frequency channel to be used based on an index value per frequency channel indicating orthogonality between the transmit antenna and the receive antenna, the distance between the transmit antenna and the receive antenna and the angle indicating the direction of arrival of the radio signal estimated by the estimation unit, and a desired bit error rate to be predetermined, and select the modulation scheme for providing a maximum transmission capacity per the selected frequency channel, a transmission signal generation unit configured to separate transmission data into a plurality of pieces of transmission data the number of which corresponds to the number of frequency channels, modulate each of the plurality of pieces of transmission data separated in accordance with the selected modulation scheme, and output a transmission signal obtained by multiplexing, with a multiplexing order, each of the plurality of pieces of transmission data that are modulated, the multiplexing order indicating the number of transmit antennas of the plurality of transmit antennas to be used, and a radio signal transmission unit configured to transmit a plurality of the transmission signals.

An aspect of the present invention is the radio communication system described above, wherein the selection unit selects the modulation scheme having the maximum transmission capacity and multiplexing order per the selected frequency channel to be used.

An aspect of the present invention is the radio communication system described above, wherein the selection unit selects the frequency channel to be used, based on a desired transmission rate to be predetermined, in addition to the index value per frequency channel indicating the orthogonality between the transmit antenna and the receive antenna, the distance between the transmit antenna and the receive antenna and the angle indicating the direction of arrival of the radio signal estimated by the estimation unit, and the desired bit error rate to be predetermined.

An aspect of the present invention is a radio communication method performed by a radio transmission device including a plurality of transmit antennas and a radio reception device including a plurality of receive antennas, the method including, by the radio reception device, demodulating a reception signal received by each of the plurality of receive antennas in accordance with a demodulation scheme corresponding to a modulation scheme selected by the radio transmission device, to generate reception data, estimating, based on the reception signal generated, a distance between the transmit antenna and the receive antenna and an angle indicating a direction of arrival of a radio signal, and, by the radio transmission device, selecting a frequency channel to be used based on an index value per frequency channel indicating orthogonality between the transmit antenna and the receive antenna, the distance between the transmit antenna and the receive antenna and the angle indicating the direction of arrival of the radio signal estimated by the radio reception device, and a desired bit error rate to be predetermined, and selecting the modulation scheme for providing a maximum transmission capacity per the selected frequency channel, separating transmission data into a plurality of pieces of transmission data the number of which corresponds to the number of frequency channels, modulating each of the plurality of pieces of transmission data separated in accordance with the selected modulation scheme, outputting a transmission signal obtained by multiplexing, with a multiplexing order, each of the plurality of pieces of transmission data that are modulated, the multiplexing order indicating the number of transmit antennas of the plurality of transmit antennas to be used, and transmitting a plurality of the transmission signals that are output.

An aspect of the present invention is a radio communication system including a radio transmission device including a plurality of transmit antennas, and a radio reception device including a plurality of receive antennas, wherein the radio transmission device includes a communication distance measurement unit configured to measure a distance between the transmit antenna and the receive antenna, a selection unit configured to select a modulation scheme that is common to all of frequency channels and satisfies an average value of index values per frequency channel indicating orthogonality between the transmit antenna and the receive antenna depending on the distance between the transmit antenna and the receive antenna measured by the communication distance measurement unit, and a desired bit error rate to be predetermined, a transmission signal generation unit configured to separate transmission data into a plurality of pieces of transmission data the number of which corresponds to the number of all frequency channels, modulate each of the plurality of pieces of transmission data separated in accordance with the selected common modulation scheme, and output a transmission signal obtained by multiplexing, with a multiplexing order, each of the plurality of pieces of transmission data that are modulated, the multiplexing order indicating the number of transmit antenna of the plurality of transmit antennas to be used, and a radio signal transmission unit configured to transmit a plurality of the transmission signals, and the radio reception device includes a demodulation unit configured to demodulate a reception signal received by each of the plurality of receive antennas in accordance with a demodulation scheme corresponding to the modulation scheme to generate reception data.

An aspect of the present invention is the radio communication system described above, wherein the selection unit selects the modulation scheme and the multiplexing order, the modulation scheme being common to all of the frequency channels and satisfying the average value of index values per frequency channel indicating the orthogonality between the transmit antenna and the receive antenna depending on the distance between the transmit antenna and the receive antenna measured by the communication distance measurement unit, and the desired bit error rate to be predetermined.

An aspect of the invention is the radio communication system described above, wherein the transmission signal generation unit performs error correction coding or interleaving on the transmission data of the frequency channel not satisfying the desired bit error rate, and the radio reception device performs, in a case where the error correction coding is performed on reception data demodulated by the demodulation unit, error correction decoding corresponding to the error correction coding, and performs, in a case where the interleaving is performed, deinterleaving corresponding to the interleaving.

An aspect of the present invention is a radio communication method performed by a radio transmission device including a plurality of transmit antennas and a radio reception device including a plurality of receive antennas, the method including, by the radio transmission device, measuring a distance between the transmit antenna and the receive antenna, selecting a modulation scheme that is common to all of frequency channels and satisfies an average value of index values per frequency channel indicating orthogonality between the transmit antenna and the receive antenna depending on the measured distance between the transmit antenna and the receive antenna, and a desired bit error rate to be predetermined, separating transmission data into a plurality of pieces of transmission data the number of which corresponds to the number of all frequency channels, modulating each of the plurality of pieces of transmission data separated in accordance with the selected common modulation scheme, outputting a transmission signal obtained by multiplexing, with a multiplexing order, each of the plurality of pieces of transmission data that are modulated, the multiplexing order indicating the number of transmit antennas of the plurality of transmit antennas to be used, and transmitting a plurality of the transmission signals, and, by the radio reception device, demodulating a reception signal received by each of the plurality of receive antennas in accordance with a demodulation scheme corresponding to the modulation scheme to generate reception data.

Effects of the Invention

According to the present invention, it is possible to maintain formation of parallel transmission paths in spatial multiplexing transmission and increase transmission capacity, even when the distance between the transmit and receive antennas changes.

BRIEF DESCRIPTION OF DRAWINGS

FIG. 2 is a diagram illustrating a configuration of a transmission scheme lookup table according to the first embodiment.

FIG. 11 is a diagram illustrating a configuration of a channel capacity table according to the second embodiment.

FIG. 12 is a sequence diagram illustrating a flow of a process by a radio communication system according to the second embodiment.

DESCRIPTION OF EMBODIMENTS

First Embodiment

Figure 1:
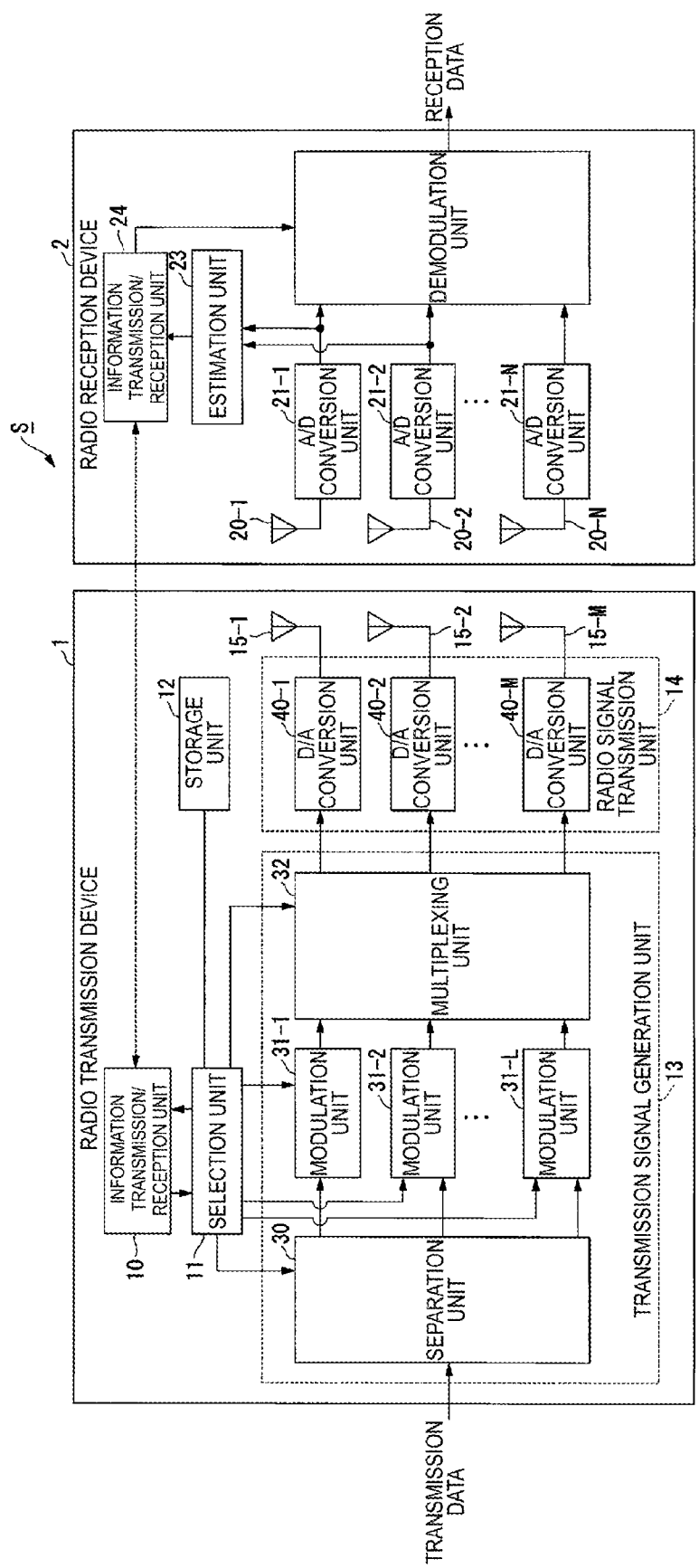
FIG. 1 is a block diagram illustrating a configuration of a radio communication system according to a first embodiment.

An embodiment of the present invention will be described below with reference to the drawings. FIG. 1 is a block diagram illustrating a configuration of a radio communication system S according to a first embodiment. The radio communication system S includes a radio transmission device 1 and a radio reception device 2. For example, the radio transmission device 1 and the radio reception device 2 are separately installed in different ships, and these two ships move in any directions.

Transmit antennas 15-1 to 15-M included in the radio transmission device 1 and receive antennas 20-1 to 20-N included in the radio reception device 2 are placed to be located under the sea that is a line-of-sight environment with no obstacle between these transmit and receive antennas. Here, M and N represent integers equal to or more than 2, where M and N may be the same value, or may be different values.

Lengths of intervals between the transmit antennas 15-1 to 15-M and lengths of intervals between the receive antennas 20-1 to 20-N are predetermined. Radio signals transmitted and received between the transmit antennas 15-1 to 15-M and the receive antennas 20-1 to 20-N are, for example, acoustic signals, but may be any signals as long as the signals are radio signals propagating undersea.

The radio reception device 2 includes N receive antennas 20-1 to 20-N, N analog to digital (analog digital) (A/D) conversion units 21-1 to 21-N, a demodulation unit (demodulator) 22, an estimation unit (estimator) 23, and an information transmission/reception unit 24.

The receive antennas 20-1 to 20-N receive radio signals transmitted by the radio transmission device 1 and outputs the received radio signals as reception signals. The A/D conversion units 21-1 to 21-N convert the analog reception signals output by the receive antennas 20-1 to 20-N respectively connected to the A/D conversion units 21-1 to 21-N, into digital reception signals.

The demodulation unit 22 demodulates the digital reception signals output by the A/D conversion units 21-1 to 21-N in accordance with a demodulation scheme corresponding to a modulation scheme used in the radio transmission device 1 and generates reception data.

The estimation unit 23 estimates, based on the digital reception signals output by the A/D conversion units 21-1 to 21-N, distances between the transmit antennas 15-1 to 15-M and the receive antennas 20-1 to 20-N (hereinafter, referred to as "between the transmit and receive antennas"), and angles indicating directions of arrival of radio signals seen from the receive antennas 20-1 to 20-N. For example, the estimation unit 23 estimates the distances between the transmit and receive antennas and the angles indicating the directions of arrival of the radio signals seen from the receive antennas 20-1 to 20-N, by using a MUSIC method described in the following reference document.

Reference document: Nobuyoshi Kikuma, "Adaptive signal processing by array antenna", Kagaku Gijutsu Shuppan, 1999, p. 194

Note that distances between the respective transmit antennas 15-1 to 15-M and the respective receive antennas 20-1 to 20-N are slightly different from each other. However, the distance estimated by the MUSIC method is assumed to be substantially the average distance between the transmit and receive antennas.

The information transmission/reception unit 24 transmits, to the radio transmission device 1, estimation information including the distance between the transmit and receive antennas estimated by the estimation unit 23, and the angle indicating the direction of arrival of the radio signal. The information transmission/reception unit 24 receives information transmitted by the radio transmission device 1, and outputs the received information to the demodulation unit 22.

The radio transmission device 1 includes an information transmission/reception unit 10, a selection unit (selector) 11, a storage unit 12, a transmission signal generation unit (transmission signal generator) 13, a radio signal transmission unit (radio signal transmitter) 14, and the M transmit antennas 15-1 to 15-M.

The information transmission/reception unit 10 receives the estimation information transmitted by the information transmission/reception unit 24 in the radio reception device 2. The information transmission/reception unit 10 transmits information output by the selection unit 11 to the information transmission/reception unit 24 in the radio reception device 2. Note that the transmission capacity required to transmit and receive information between the information transmission/reception unit 10 and the information transmission/reception unit 24 may be a low transmission capacity. Furthermore, communication between the information transmission/reception unit 10 and the information transmission/reception unit 24 is performed by, for example, radio communication through the sea with good communication quality, or by radio communication of electromagnetic waves propagating through air with good communication quality.

The storage unit 12 pre-stores information on the lengths of the intervals between the transmit antennas 15-1 to 15-M and the lengths of the intervals between the receive antennas 20-1 to 20-N, a transmission scheme lookup table 121 illustrated in FIG. 2, and transmission scheme information corresponding to the transmission scheme indicated in the transmission scheme lookup table 121.

Here, the transmission scheme information is information including information indicating the modulation scheme and multiplexing order in the LoS-MIMO scheme. The multiplexing order is a value indicating how many of the transmit antennas 15-1 to 15-M are used. For example, in a case where only the transmit antenna 15-1 and the transmit antenna 15-M on both ends are used, multiplexing order is "2". The information indicating the modulation scheme includes a scheme such as quadrature amplitude modulation (QAM), information indicating a multivalued degree in the scheme, and information on a coding rate.

As illustrated in FIG. 2, the transmission scheme lookup table 121 includes a plurality of transmission scheme lookup tables 121-1 to 121-X corresponding to the number of combinations of the distance between the transmit and receive antennas and the angle indicating the direction of arrival of the radio signal. Note that X represents an integer that matches the number of combinations of the predetermined distances and angles. Each of the transmission scheme lookup tables 121-1 to 121-X has the same data format.

The data format will be described referring to the transmission scheme lookup table 121-1 illustrated in FIG. 2 as an example. The transmission scheme lookup table 121-1 has items of "distance" and "angle" as indices. A value indicating the length in units of [m] is written into the "distance" item. A value indicating the magnitude of the angle in units of [degrees] is written into the "angle" item.

The transmission scheme lookup table 121-1 has a frequency channel item as an item in a longitudinal direction. A value written into the frequency channel item is, for example, the center frequency of the frequency channel, and is written in units of [Hz].

The transmission scheme lookup table 121-1 has an information item indicating the type of transmission scheme as an item in a lateral direction. Each of the types of the transmission schemes is associated with the transmission scheme information stored in the storage unit 12.

In FIG. 2, "transmission rate maximum", "transmission rate high", "transmission rate medium", and "transmission rate low" associated with the information indicating the type of transmission scheme information indicate sections obtained by dividing the transmission rate by three thresholds. Assuming that three thresholds are a first transmission rate threshold, a second transmission rate threshold, and a third transmission rate threshold, where a relationship of the first transmission rate threshold>the second transmission rate threshold>the third transmission rate threshold is established.

At this time, the "transmission rate maximum" corresponds to a section to which a transmission rate exceeding the first transmission rate threshold belongs. The "transmission rate high" corresponds to a section to which a transmission rate that is equal to or less than the first transmission rate threshold and exceeds the second transmission rate threshold belongs. The "transmission rate medium" corresponds to a section to which a transmission rate that is equal to or less than the second transmission rate threshold and exceeds the third transmission rate threshold belongs. The "transmission rate low" corresponds to a section to which a transmission rate that is equal to or less than the third transmission rate threshold belongs. Thus, selection of a transmission scheme A is to select the scheme for transmission at the maximum transmission rate, i.e., with the highest transmission capacity. In addition, selection of a transmission scheme D is to select the scheme for transmission with the lowest transmission capacity.

The ranks, "Good", "Fair", and "Poor" are written into elements each of which is specified by the two items in the longitudinal and lateral directions, based on a magnitude of a bit error rate actually measured per distance, angle, and transmission scheme. The ranks, "Good", "Fair", and "Poor" indicate sections obtained by dividing the actually measured bit error rates by two thresholds. Assume that two thresholds are a first bit error rate threshold and a second bit error rate threshold, where a relationship of the first bit error rate threshold<the second bit error rate threshold is established.

At this time, "Good" indicates that a bit error rate is less than the first hit error rate threshold. Also, "Fair" indicates that a bit error rate is equal to or more than the first bit error rate threshold and less than the second bit error rate threshold. Also, "Poor" indicates that a bit error rate is equal to or more than the second bit error rate threshold.

In addition, the selection unit 11 refers to the transmission scheme lookup table 121 corresponding to the distance between the transmit and receive antennas and the angle indicating the direction of arrival of the radio signal, to select, per frequency channel, a transmission scheme that has a transmission rate equal to or more than a desired transmission rate with the maximum transmission capacity and satisfies a desired hit error rate. In a case where the transmission rate equal to or more than the desired transmission rate and satisfies the desired bit error rate cannot be selected, the selection unit 11 does not select the frequency channel, and the frequency channel is not to be used.

The selection unit 11 outputs, to the transmission signal generation unit 13, selection information including information indicating the frequency channel to be used and the transmission scheme information per frequency channel to be used. The selection unit 11 outputs the selection information to the information transmission/reception unit 10.

The selection unit 11 outputs, to each of the modulation units 31-1 to 31-L in the transmission signal generation unit 13, the information indicating any one frequency channel selected from among the frequency channels to be used such that the frequency channels for the modulation units are different from each other, and the transmission scheme information corresponding to the selected frequency channel, rather than outputting the selection information as it is.

The transmission signal generation unit 13 includes a separation unit 30, L modulation units 31-1 to 31-L, and a multiplexing unit 32. Here, L may be any value as long as it is an integer of 2 or greater, and, for example, may be the number of frequency channels available undersea. In addition, L may be the same value as M or may be a different value from M. In addition, L may be the same value as N or may be a different value from N.

The separation unit 30 counts the number of frequency channels included in the selection information output by the selection unit 11. The separation unit 30 separates transmission data into pieces the number of which is the number of counted frequency channels, and outputs the separated pieces of transmission data to the modulation units 31-1 to 31-L.

Each of the modulation units 31-1 to 31-L is connected to the selection unit 11. Each of the modulation units 31-1 to 31-L takes in the information indicating the frequency channel and the transmission scheme information output by the selection unit 11 to the modulation unit. Here, the information indicating the frequency channel is, for example, the center frequency of the frequency channel. Each of the modulation units 31-1 to 31-L modulates the separated piece of transmission data output by the separation unit 30 to the modulation unit in accordance with the modulation scheme indicated with the taken center frequency and transmission scheme information to generate a transmission signal.

The multiplexing unit 32 separates each of the transmission signals per frequency channel output by the modulation units 31-1 to 31-L in accordance with multiplexing order per frequency channel indicated in the transmission scheme information included in the selection information output by the selection unit 11. The multiplexing unit 32 outputs the respective separated transmission signals to digital to analog (digital analog) (D/A) conversion units 40-1 to 40-M that are output destinations predetermined depending on multiplexing order.

Note that in a case where the multiplexing order is smaller than M that is the number of transmit antennas 15-1 to 15-M, a combination of the transmit antennas 15-1 to 15-M used to transmit the radio signal is assumed to be predetermined. For example, in a case where the multiplexing order is "2", it is predetermined to use both ends, that is, the transmit antenna 15-1 and the transmit antenna 15-M, between which interval is the farthest and from which radio signals streams are likely to be independent. Information on the combination of the transmit antennas 15-1 to 15-M depending on multiplexing order is pre-stored in a storage area in the multiplexing unit 32.

The radio signal transmission unit 14 includes M D/A conversion units 40-1 to 40-M. Each of the D/A conversion units 40-1 to 40-M converts the digital transmission signal output by the multiplexing unit 32 into an analog transmission signal. The respective D/A conversion units 40-1 to 40-M output the converted analog transmission signals to the transmit antennas 15-1 to 15-M connected to the D/A conversion units 40-1 to 40-M. The transmit antennas 15-1 to 15-M transmit the analog transmission signals output by the D/A conversion units 40-1 to 40-M as radio signals to the radio reception device 2.

Process of Radio Communication System in First Embodiment

Figure 3:
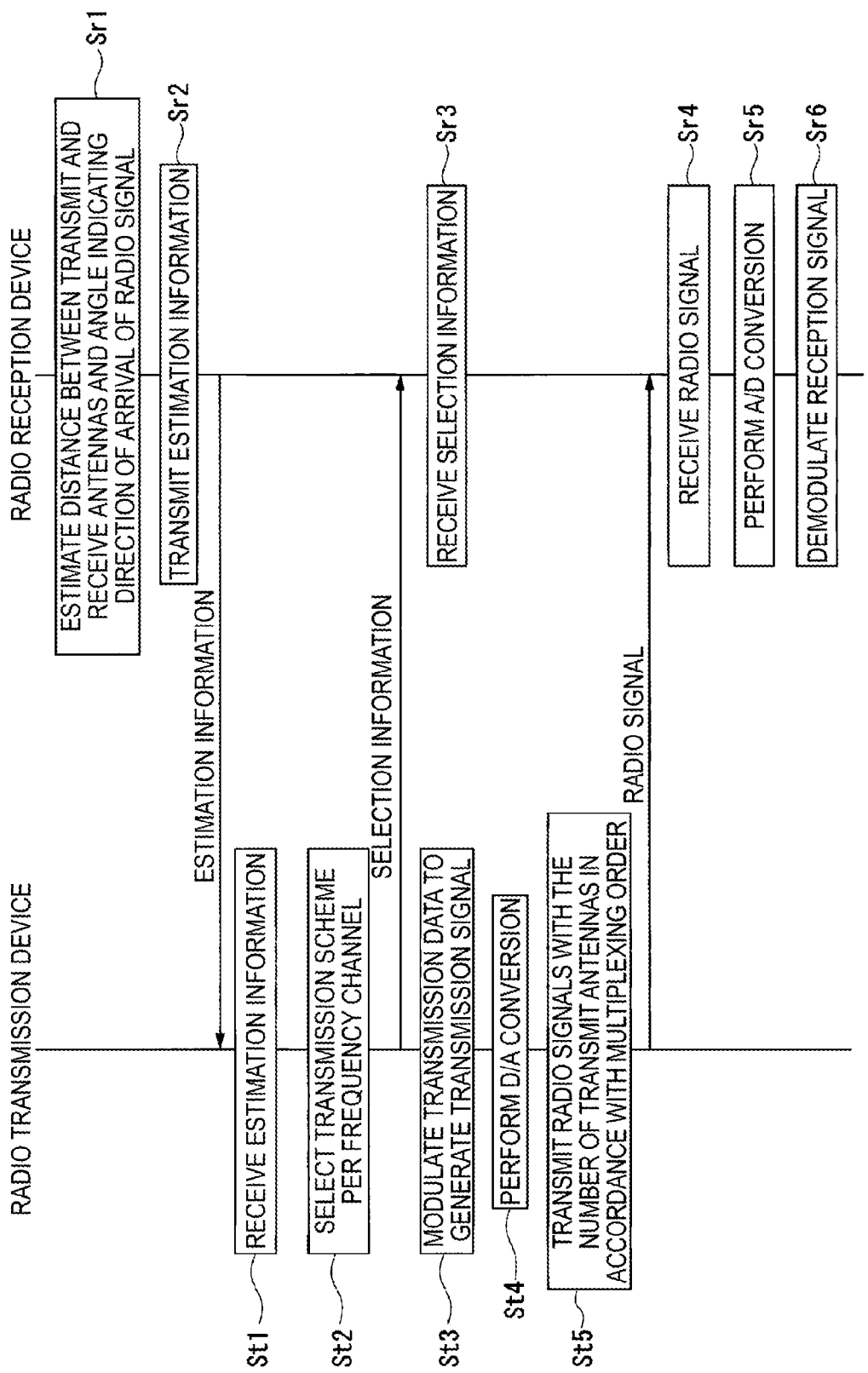
FIG. 3 is a sequence diagram illustrating a flow of a process by the radio communication system according to the first embodiment.

FIG. 3 is a sequence diagram illustrating a flow of a process by the radio communication system S according to the first embodiment. Assume that the transmit antennas 15-1 to 15-M in the radio transmission device 1 transmit radio signals that are modulated in accordance with any modulation schemes and spatial-multiplexed by any of multiplexing order.

The receive antennas 20-1 to 20-N in the radio reception device 2 receive the radio signals transmitted by the radio transmission device 1. The A/D conversion units 21-1 to 21-N convert analog reception signals output by the receive antennas 20-1 to 20-N into digital reception signals.

The estimation unit 23 takes in the digital reception signal output by the A/D conversion units 21-1 to 21-N and applies the MUSIC method to the taken reception signal to estimate the distance between the transmit and receive antennas and the angle indicating the direction of arrival of the radio signal (step Sr1).

The estimation unit 23 outputs, to the information transmission/reception unit 24, the estimation information including the estimated distance between the transmit and receive antennas and the estimated angle indicating the direction of arrival of the radio signal. The information transmission/reception unit 24 transmits the estimation information output by the estimation unit 23 to the information transmission/reception unit 10 in the radio transmission device 1 (step Sr2).

The information transmission/reception unit 10 receives the estimation information transmitted by the information transmission/reception unit 24 and outputs the received estimation information to the selection unit 11 (step St1).

The selection unit 11 takes in the estimation information output by the information transmission/reception unit 10 and reads information on the distance between the transmit and receive antennas and the angle of the direction of arrival of the radio signal that are included in the taken estimation information.

The selection unit 11 refers to one of the transmission scheme lookup tables 121-1 to 121-X corresponding to the distance between the transmit and receive antennas and the angle indicating the direction of arrival of the radio signal that are taken in from the information transmission/reception unit 10.

Here, assume that the distance between the transmit and receive antennas and the angle indicating the direction of arrival of the radio signal that are included in the estimation information are "10 m" and "30 degrees", respectively. The selection unit 11 refers to the transmission scheme lookup table 121-1 corresponding to the distance "10 m" and the angle "30 degrees".

The selection unit 11 selects, per frequency channel, a transmission scheme that has a transmission rate equal to or more than a desired transmission rate with the maximum transmission capacity and satisfies a desired bit error rate. For example, assume that the desired bit error rate is a bit error rate less than the first bit error rate threshold. In this case, the selection unit 11 selects the transmission scheme matching the condition that the bit error rate is "Good" in the transmission scheme lookup table 121-1. Assume that the desired transmission rate is the third transmission rate threshold. In this case, the selection unit 11 selects the transmission scheme matching the condition of a transmission scheme C or higher scheme, that is, any one of transmission schemes A, B, and C in the transmission scheme lookup table 121-1.

The selection unit 11 detects a transmission scheme in which the bit error rate is "Good" in the records of the frequencies $f_0$ to $f_5$ in the transmission scheme lookup table 121-1. Because there is no transmission scheme matching the bit error rate of "Good" for the frequency $f_0$, the selection unit 11 does not select the frequency channel of the frequency $f_0$. In contrast, there are the transmission schemes in which the bit error rate is "Good" in the frequencies $f_1$ to $f_5$. Furthermore, the selection unit 11 selects a frequency channel that uses a frequency channel satisfying any one of the transmission schemes A, B, and C having the bit error rate "Good". In this case, concerning the frequency $f_5$, the transmission scheme D has the bit error rate "Good", but transmission schemes A, B, and C have the bit error rate "Poor" or "Fair". Therefore, the selection unit 11 excludes the frequency channels of frequencies $f_0$ and $f_5$ as frequency channels that are not high in the orthogonality. In this way, the selection unit 11 selects, for the respective frequencies $f_1$ to $f_4$ that are frequency channels to be used, the transmission scheme C, the transmission scheme B, the transmission scheme C, and the transmission scheme C, which are the transmission schemes that satisfy the bit error rate "Good" and have the transmission rate equal to or more than the desired transmission rate with the maximum transmission capacity.

The selection unit 11 reads the transmission scheme information corresponding to the selected transmission scheme B and transmission scheme C from the storage unit 12. Here, assume that multiplexing order included in the transmission scheme information for the transmission scheme C is "2", and multiplexing order included in the transmission scheme information for the transmission scheme B is "M".

The selection unit 11 generates selection information including a combination of the frequency $f_1$ and the transmission scheme information for the transmission scheme C, a combination of the frequency $f_2$ and the transmission scheme information for the transmission scheme B, a combination of the frequency $f_3$ and the transmission scheme information for the transmission scheme C, and a combination of the frequency $f_4$ and the transmission scheme information for the transmission scheme C (step St2). The selection unit 11 outputs the generated selection information to the information transmission/reception unit 10. The information transmission/reception unit 10 transmits the selection information output by the selection unit 11 to the information transmission/reception unit 24 in the radio reception device 2.

The information transmission/reception unit 24 receives the selection information transmitted by the information transmission/reception unit 10 and outputs the received selection information to the demodulation unit 22. The demodulation unit 22 in the radio reception device 2 takes in the selection information output by the information transmission/reception unit 24 and configures a demodulation scheme corresponding to the modulation scheme per frequency channel included in the selection information (step Sr3).

The selection unit 11 outputs the generated selection information to the transmission signal generation unit 13. In other words, the selection unit 11 outputs the frequency $f_1$ and transmission scheme information for the transmission scheme C included in the selection information to the modulation unit 31-1, outputs the frequency $f_2$ and transmission scheme information for the transmission scheme B included in the selection information to the modulation unit 31-2, and outputs the frequency $f_3$ and transmission scheme information for the transmission scheme C included in the selection information to the modulation unit 31-3, and outputs the frequency $f_4$ and transmission scheme information for the transmission scheme C included in the selection information to the modulation unit 31-4. The selection unit 11 outputs the selection information to the separation unit 30 and the multiplexing unit 32.

The separation unit 30 counts the number of frequency channels included in the selection information. Here, there are four frequency channels having the center frequencies of the frequencies $f_1$ to $f_4$, and thus, the count results in "4". The separation unit 30 separates the transmission data into four pieces and outputs four separated pieces of transmission data to the modulation units 31-1 to 31-4.

The modulation units 31-1, 31-3, and 31-4 modulate the transmission data output by the separation unit 30 to generate the transmission signals in accordance with the modulation scheme included in the transmission scheme information for the transmission scheme C, and the frequencies $f_1$, $f_3$, and $f_4$ given to the modulation units 31-1, 31-3, and 31-4, respectively.

Each of the modulation units 31-1, 31-3, and 31-4 outputs the generated transmission signal to the multiplexing unit 32. The multiplexing unit 32 reads the multiplexing order "2" from the transmission scheme information for the transmission scheme C and transmission scheme D included in the selection information. The multiplexing unit 32 separates the transmission signal output by each of the modulation units 31-1, 31-3, and 31-4 into two pieces, and outputs the respective separated transmission signals to the D/A conversion unit 40-1 and the D/A conversion unit 40-M that are on both ends.

In contrast, the modulation unit 31-2 modulates the transmission data output by the separation unit 30 to generate the transmission signal in accordance with the modulation scheme included in the transmission scheme information for the transmission scheme B, and the frequency $f_2$. The modulation unit 31-2 outputs the generated transmission signal to the multiplexing unit 32. The multiplexing unit 32 reads the multiplexing order "M" from the transmission scheme information for the transmission scheme B included in the selection information. The multiplexing unit 32 separates the transmission signal generated by the modulation unit 31-2 into M pieces, and outputs M respective separated transmission signals to the D/A conversion units 40-1 to 40-M (step St3).

At this time, the D/A conversion unit 40-1 and the D/A conversion unit 40-M on both ends are given a portion of the transmission signal generated by the modulation unit 31-1 and a portion of the transmission signal generated by the modulation unit 31-2 that are coupled by the multiplexing unit 32.

The D/A conversion units 40-1 to 40-M convert the digital transmission signals output to the respective D/A conversion units 40-1 to 40-M by the multiplexing unit 32 into analog transmission signals (step St4). The D/A conversion units 40-1 to 40-M transmit the converted analog transmission signals through the transmit antennas 15-1 to 15-M to the radio reception device 2 (step St5).

The receive antennas 20-1 to 20-N receive the radio signals transmitted by the radio transmission device 1 and output the received radio signals as reception signals (step Sr4). The A/D conversion units 21-1 to 21-N convert the analog reception signals output by the receive antennas 20-1 to 20-N respectively connected to the A/D conversion units 21-1 to 21-N into digital reception signals and output the converted digital reception signals to the demodulation unit 22 and the estimation unit 23 (step Sr5).

The demodulation unit 22 takes in the digital reception signals output by the A/D conversion units 21-1 to 21-N, couples the taken reception signals, and demodulates the reception signals in accordance with the demodulation scheme configured in step Sr3 to generate reception data (step Sr6).

The radio transmission device 1 repeatedly performs the processes in steps St1 to St5, and the radio reception device 2 repeatedly performs the processes in steps Sr1 to Sr6. As a result, even in a case where a ship provided with the radio transmission device 1 and a ship provided with the radio reception device 2 move in any directions, and thereby, the distance between the transmit and receive antennas is changed, the estimation unit 23 in the radio reception device 2 continues to estimate a new distance between the transmit and receive antennas, and the direction of arrival of the radio signal. As a result, the selection unit 11 in the radio transmission device 1 can continue to select a frequency channel having high orthogonality.

Figure 4:
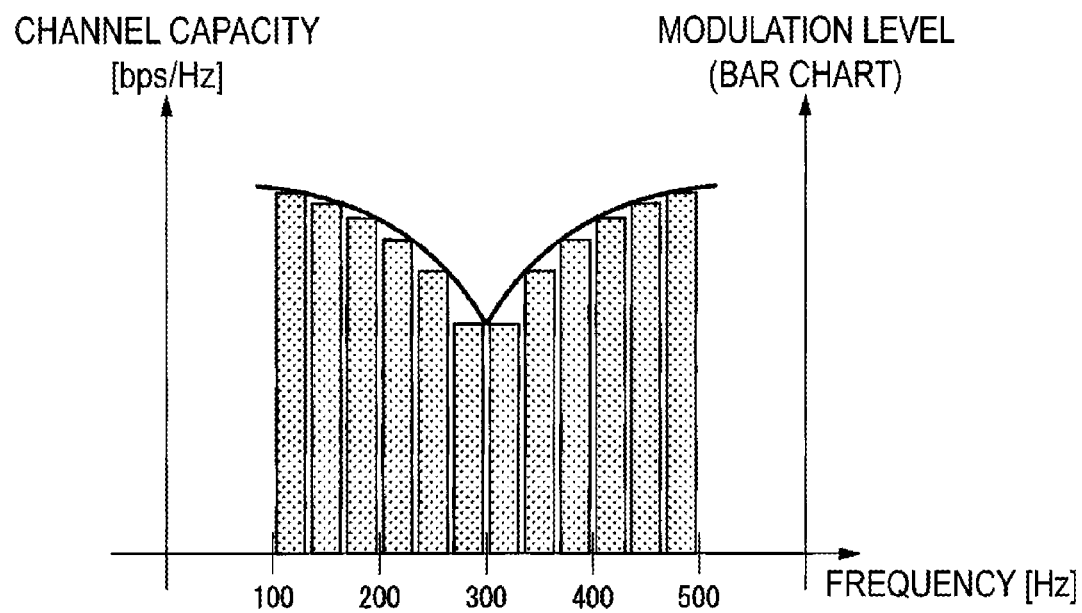
FIG. 4 is a graph (part 1) illustrating a relationship between a channel capacity and modulation level per frequency channel in a case where a transmission scheme is assigned per frequency channel to be used according to the first embodiment.
Figure 5:
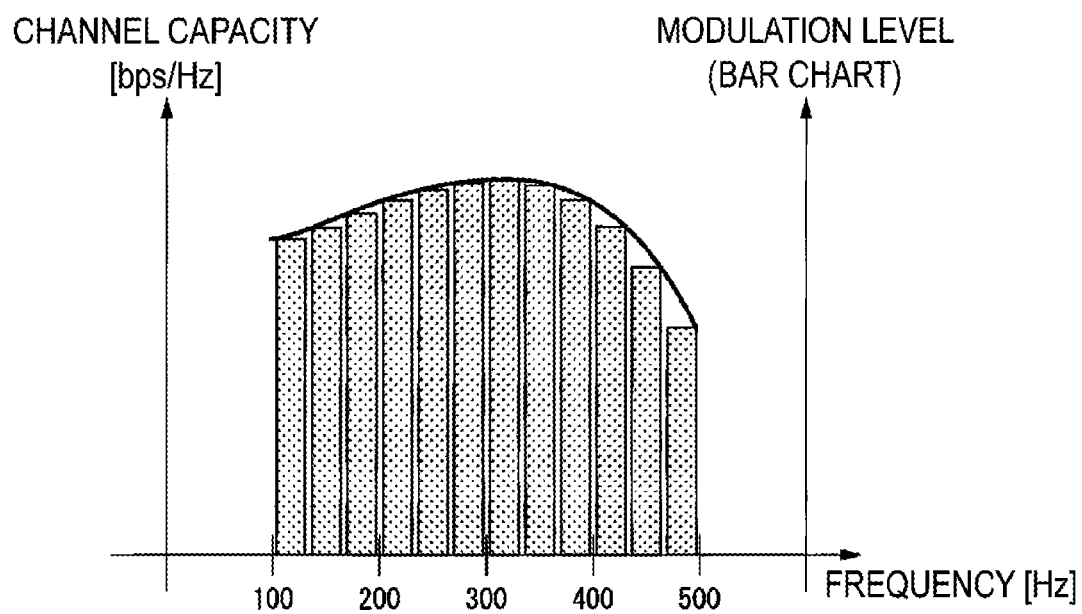
FIG. 5 is a graph (part 2) illustrating a relationship between a channel capacity and modulation level per frequency channel in the case where a transmission scheme is assigned per frequency channel used according to the first embodiment.

For example, FIG. 4 is a graph illustrating a relationship between the channel capacity and the modulation level in the modulation scheme per frequency channel in a case where the distance between the transmit and receive antennas is "10 m". FIG. 5 is a graph illustrating a relationship between the channel capacity and the modulation level in the modulation scheme per frequency channel in a case where the distance between the transmit and receive antennas is "15 m". In each of FIGS. 4 and 5, a horizontal axis represents a frequency value. Here, the channel capacity refers to a value in units of [bps/Hz] and is a value indicating the transmission capacity per 1 Hz. Even if the distances between the transmit and receive antennas are identical and the angles each indicating the direction of arrival of the radio signal is identical, the orthogonality of the transmission paths varies depending on the frequency and the channel capacity changes. In other words, the channel capacity is an index value indicating the orthogonality between the transmit and receive antennas, which shows that the orthogonality becomes higher as the value of the channel capacity becomes greater.

In each of FIGS. 4 and 5, a line of change characteristics illustrated by a solid line indicates a change in the channel capacity, and a bar graph indicates the modulation level. In the first embodiment, the appropriate transmission scheme is selected per frequency channel to be used, so the modulation level varies every frequency channel.

In the graph in FIG. 4, referring to the change characteristics of the channel capacity, the channel capacity is high near the frequencies of "100 Hz" and "500 Hz" on both ends, but the channel capacity is low near the center at the frequency of "300 Hz". Therefore, the selection unit 11 sets the smaller modulation level in the modulation scheme so that the bit error rate does not increase near the frequency of "300 Hz".

In contrast, referring to the change characteristics of the channel capacity in the graph in FIG. 5, the channel capacity is high near the frequency of "300 Hz", and the channel capacity decreases toward the frequencies of "100 Hz" and "500 Hz" on both ends. Therefore, the selection unit 11 sets the lower modulation level in the modulation scheme so that the bit error rate does not increase near the frequencies of "100 Hz" and "500 Hz". In addition, the channel capacity near "500 Hz" is smaller than near "100 Hz", and then, the modulation level near "500 Hz" is even smaller than the modulation level near "100 Hz".

Note that in step St2 described above, the selection unit 11 uses the transmission scheme lookup table 121 illustrated in FIG. 2 to select the frequency channel to be used and the transmission scheme for the frequency channel to be used. In contrast, the selection unit 11 may calculate the channel capacity without using the transmission scheme lookup table 121 to select the transmission scheme that satisfies the desired bit error rate and has the transmission rate equal to or more than the desired transmission rate with the maximum transmission capacity.

Each element of the transmission scheme lookup table 121 illustrated in FIG. 2 may be indicative of the channel capacity identified by the distance, angle, frequency channel, transmission scheme, and bit error rate. The transmission scheme lookup table 121 indicates the bit error rate in three sections: "Good", "Fair", and "Poor". Thus, it can be said that the transmission scheme lookup table 121 indicates the channel capacity for each distance and angle by combinations of four transmission schemes, six frequency channels, and three-bit error rates. The channel capacity indicated in the transmission scheme lookup table 121 is a value based on actual measurements, but the channel capacity can be calculated by calculation.

In a case where, for example, the number of transmit antennas and the number of receive antennas are the same number M, the channel capacity can be calculated by the method described in the following reference document.

Reference document: Kentaro Nishimori, Naoki Honma, Tomohiro Seki, and Ken Hiraga, "On the Transmission Method for Short-Range MIMO Communication", IEEE Transactions On Vehicular Technology, Vo. 60, No. 3, March 2011, pp. 1247-1251

For example, vector notation of a distance $r_{ij}$ between each of the receive antennas 20-1 to 20-$i$ to 20-M and each of the transmit antennas 15-1 to 15-$j$ to 15-M is represented by Equation (2) below.

[Math. 2]

$$r_{ij}=(x_{Ri}-x_{Tj}, y_{Ri}-y_{Tj}, D) \tag{2}$$

In Equation (2), $x_{Tj}$ and $y_{Tj}$ represent an X coordinate value and a Y coordinate value of the transmit antenna 15-$j$, respectively. Moreover, $x_{Ri}$ and $y_{Ri}$ represent an X coordinate value and a Y coordinate value of the receive antenna 20-$i$, respectively. Relative XY coordinates of $x_{Tj}$ and $y_{Tj}$, and $x_{Ri}$ and $y_{Ri}$ can be determined based on the angle indicating the direction of arrival of the radio signal included in the estimation information. Additionally, D represents a distance between the transmit and receive antennas included in the estimation information. $r_{ij}$ is determined by Equation (3) below.

[Math. 3]

$$r_{ij}=\sqrt{(x_{Ri}-x_{Tj})^2+(y_{Ri}-y_{Tj})^2+D^2} \tag{3}$$

A channel coefficient by between the transmit and receive antennas is determined by Equation (4) below.

[Math. 4]

$$h_{ij} = E_T(\theta_{ij}, \phi_{ij})E_R(\pi-\theta_{ij}, \pi+\phi_{ij}) \cdot e^{-jkr_{ij}}\left(\frac{\lambda_0}{4\pi r_{ij}}\right) \tag{4}$$

In Equation (4), $(\theta_{ij}, \phi_{ij})$, represents coordinate values expressing $r_{ij}$ in a spherical coordinate system. k and $\lambda_0$ represent a wave number and a wavelength, respectively, and are different values every frequency channel $E_T$ and $E_R$ represent functions of $(\theta_{ij}, \phi_{ij})$ and are calculated as a square root of the gain of the transmit antenna and a square root of the gain of the receive antenna, respectively.

A matrix including the channel coefficient $h_{ij}$ as an element is a channel matrix H. The channel matrix H is expressed by singular value decomposition as Equation (5) below.

[Math. 5]

$$H=U\Lambda V^H \tag{5}$$

In Equation (5), a matrix U and a matrix V are unitary matrices. A matrix $\Lambda$ is a matrix including a square root of an eigenvalue as an element.

Using the eigenvalue obtained by the matrix $\Lambda$, the channel capacity C can be calculated by Equation (6) below.

[Math. 6]

$$C = \sum_{i=1}^{M}\log_2\left(1+\lambda_i\frac{\gamma_0}{M}\right) \tag{6}$$

In Equation (6), $\lambda_i$ represents an eigenvalue obtained from the matrix $\Lambda$, and $\gamma_0$ represents a signal to noise ratio (SNR), i.e., a signal-to-noise ratio. By defining the transmission scheme, the SNR required to satisfy the desired bit error rate is defined.

Accordingly, in the process of step St2 described above, the selection unit 11, rather than referring to the transmission scheme lookup table 121, may select the transmission scheme per frequency channel as follows. For example, the selection unit 11 calculates the channel capacity per frequency channel by Equation (6), based on the estimation information received by the information transmission/reception unit 10, the lengths of the intervals between the transmit antennas 15-1 to 15-M and the lengths of the intervals between the receive antennas 20-1 to 20-N stored by the storage unit 12, the distance between the transmit and receive antennas, and the SNR obtained from the transmission power in transmission by the radio transmission device 1. The selection unit 11 selects, as the frequency channel to be used, a frequency channel of which the calculated channel capacity value per frequency channel exceeds a predetermined channel capacity threshold. This allows the selection unit 11 to select the frequency channel having high orthogonality. The selection unit 11 selects, for the frequency channel selected as the frequency channel to be used, a transmission scheme that satisfies the desired bit error rate with respect to the SNR and has the highest transmission rate equal to or more than the desired transmission rate.

Note that the selection unit 11 selects, per frequency channel, a transmission scheme that has a transmission rate equal to or more than a desired transmission rate with the maximum transmission capacity and satisfies the desired bit error rate. Here, in a case where every transmission scheme has a transmission rate equal to or more than the desired transmission rate, the selection unit 11 may select, per frequency channel, a transmission scheme that has the maximum transmission capacity and satisfies a desired bit error rate.

In the configuration according to the first embodiment described above, the estimation unit 23 in the radio reception device 2 estimates the distance between the transmit and receive antennas and the angle indicating the direction of arrival of the radio signal, based on the reception signals output by the A/D conversion units 21-1 to 21-N. The selection unit 11 in the radio transmission device 1 selects the frequency channel to be used, based on the channel capacity per frequency channel indicating the orthogonality between the transmit antenna and the receive antenna, the distance between the transmit and receive antennas and the angle indicating the direction of arrival of the radio signal estimated by the estimation unit 23, and the desired bit error rate to be predetermined. Then, the selection unit 11 selects a transmission scheme for providing the maximum transmission capacity per selected frequency channel. The transmission signal generation unit 13 separates the transmission data into pieces the number of which is the number of frequency channels to be used and modulates the respective pieces of separated transmission data in accordance with the transmission schemes corresponding to the respective pieces of separated transmission data to generate transmission signals. Then, the transmission signal generation unit 13 multiplexes the generated transmission signals by multiplexing order indicated in the transmission scheme, and outputs the multiplexed signals.

This allows the transmission scheme that has the maximum transmission capacity and satisfies the desired bit error rate to be selected, per frequency channel, to enable the radio communication with the high channel capacity. In addition, the frequency channel that does not satisfy the desired hit error rate is not used, and so, the frequency channel having high orthogonality can be selected.

The transmission signal generation unit 13 in the radio transmission device 1 includes a plurality of modulation units 31-1 to 31-L to which a plurality of frequency channels is allocated. This makes a plurality of frequency channels available. Therefore, even if the distance between the transmit and receive antennas changes and the orthogonality of the transmission paths is broken, the frequency channel having high orthogonality in the transmission path can be selected and switched. Therefore, it is possible to obtain a stable large transmission capacity in the mobile communication environment. Furthermore, in the undersea radio communication, the frequency band that the radio communication system S can use is not prescribed in a regulatory manner in contrast to radio waves propagating through air. Thus, a wide frequency can be taken as needed. As such, the radio communication system S can select the frequency channel having high orthogonality between the transmit and receive antennas, that is, a frequency channel capable of radio communication with high quality and high capacity, from a wide frequency band. According to the configuration of the first embodiment described above, it is possible to maintain the formation of the parallel transmission paths in the spatial multiplexing transmission and increase the transmission capacity even when the distance between the transmit and receive antennas changes in the line-of-sight environment.

Figure 6:
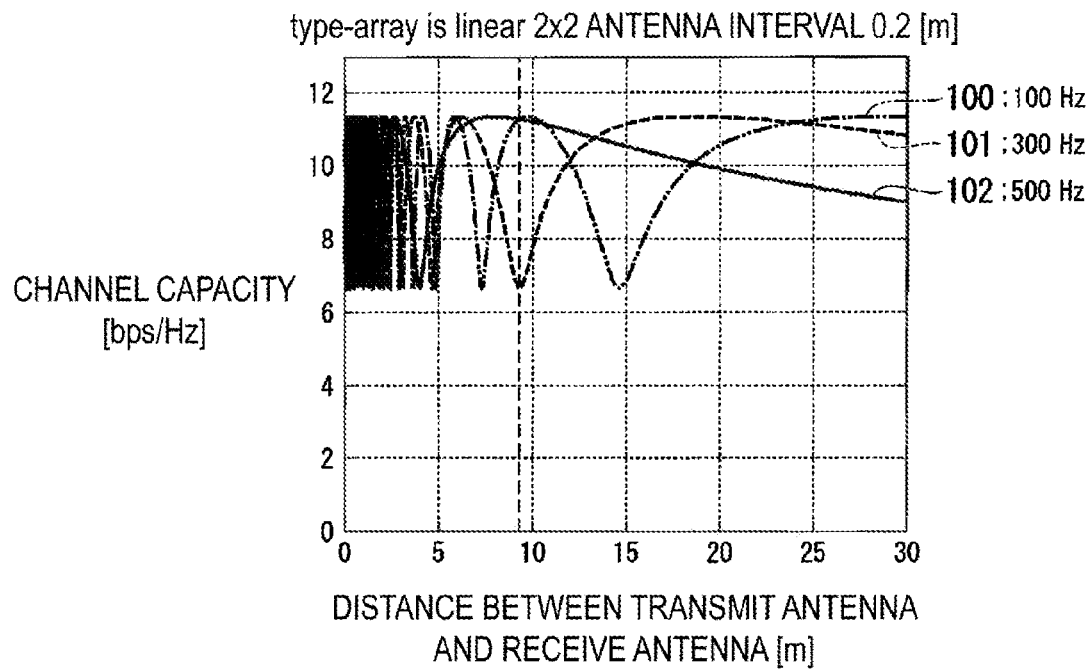
FIG. 6 is a graph illustrating distance characteristics of the channel capacity per frequency in a case of using the LoS-MIMO technique.
Figure 7:
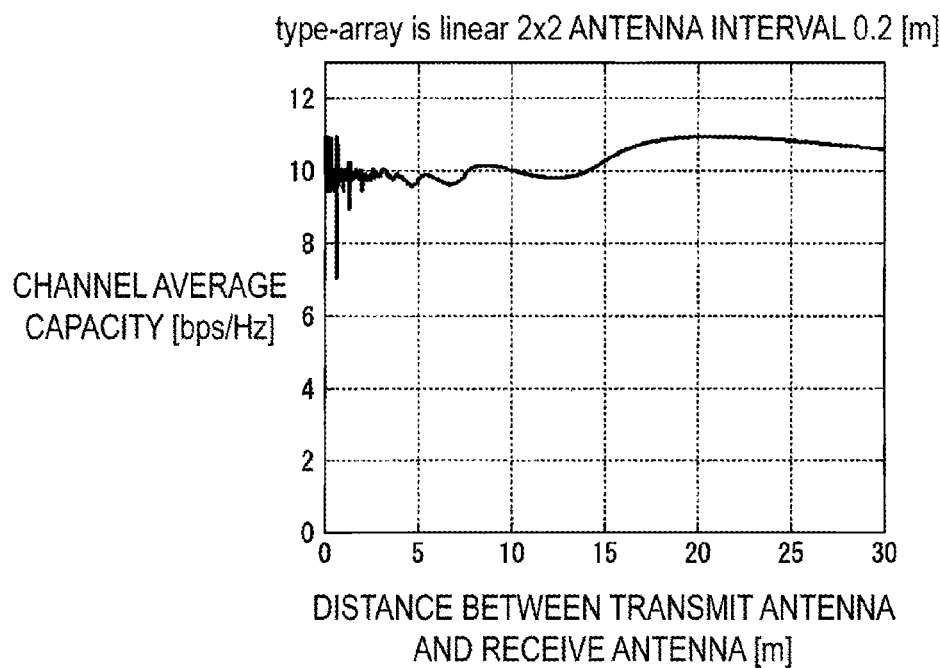
FIG. 7 is a graph illustrating the distance characteristics of the channel capacity in a case of using a configuration according to the first embodiment.

FIGS. 6 and 7 are graphs illustrating the distance between the transmit and receive antennas and the change characteristics of the channel capacity. In FIGS. 6 and 7, a horizontal axis represents the distance between the transmit and receive antennas, and a vertical axis represents the channel capacity.

In FIG. 6, a reference sign 100 denotes the change characteristics of the frequency of "100 Hz", a reference sign 101 denotes the change characteristics of the frequency of "300 Hz", and a reference sign 102 denotes the change characteristics of the frequency of "500 Hz". As can be seen from FIG. 6, there exist characteristics in which the channel capacity varies greatly depending on the frequency as the distance between the transmit and receive antennas changes.

In contrast, FIG. 7 is a graph illustrating the distance between the transmit and receive antennas, and the change characteristics of the channel capacity in a case where the configuration according to the first embodiment is adopted. As illustrated in FIG. 7, in the configuration of the first embodiment, a plurality of frequency channels is used, excluding frequency channels for which there is no transmission scheme that satisfies the desired bit error rate. As a result, the changes in the channel capacities different every frequency channel are averaged, and the channel capacity can be maintained at approximately 10 bps/Hz even when the distance between the transmit and receive antennas changes. Specifically, it can be said that the orthogonality can be maintained even when the distance between the transmit and receive antennas changes.

Second Embodiment

Figure 8:
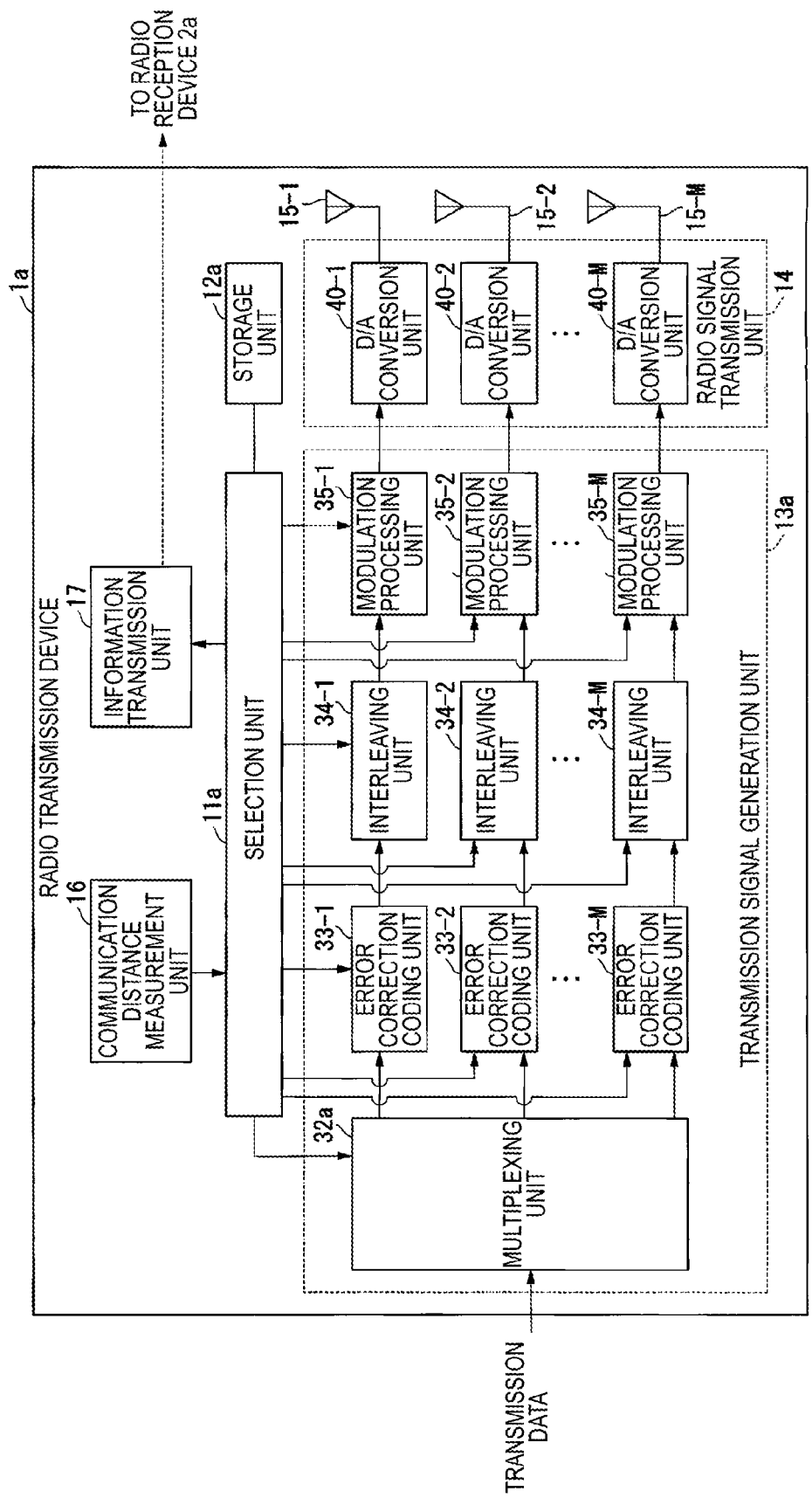
FIG. 8 is a block diagram illustrating a configuration of a radio transmission device according to a second embodiment.
Figure 10:
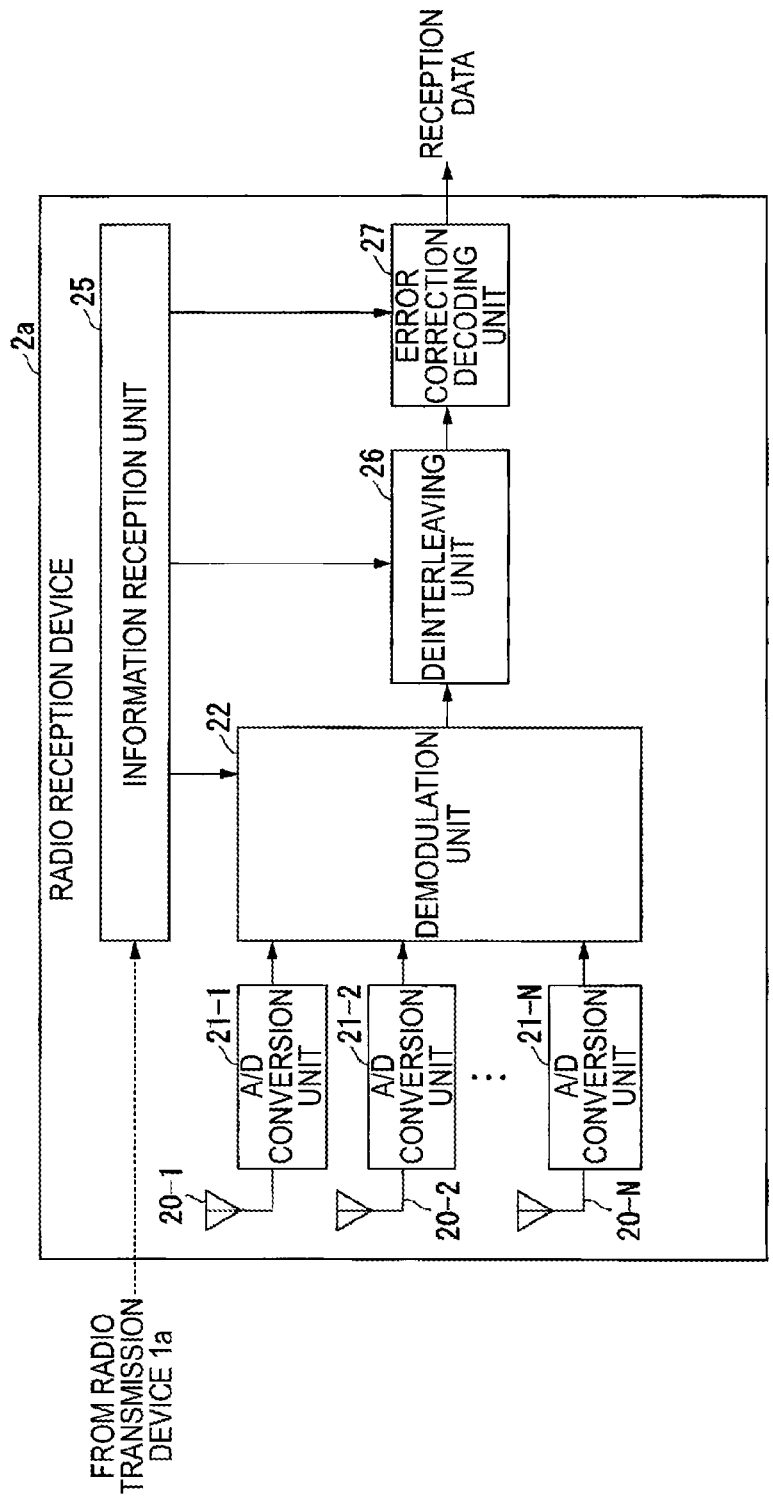
FIG. 10 is a block diagram illustrating a configuration of the radio transmission device according to the second embodiment.

FIG. 8 is a block diagram illustrating a configuration of a radio transmission device 1a according to a second embodiment, and FIG. 10 is a block diagram illustrating a configuration of a radio reception device 2a according to the second embodiment. For convenience of explanation, a system provided with the radio transmission device 1a and the radio reception device 2a is referred to as a radio communication system Sa. The same components as in the radio communication system S according to the first embodiment are denoted by the same reference signs, and different components will be described below.

Similar to the first embodiment, the transmit antennas 15-1 to 15-M included in the radio transmission device 1a and the receive antennas 20-1 to 20-N included in the radio reception device 2a are placed to be located under the sea that is a line-of-sight environment with no obstacle between these transmit and receive antennas. Lengths of intervals between the transmit antennas 15-1 to 15-M and lengths of intervals between the receive antennas 20-1 to 20-N are predetermined. Similar to the first embodiment, radio signals transmitted and received between the transmit antennas 15-1 to 15-M and the receive antennas 20-1 to 20-N are, for example, acoustic signals, but may be any signals as long as the signals are radio signals propagating undersea.

The radio transmission device 1a includes a selection unit 11a, a storage unit 12a, a transmission signal generation unit 13a, the radio signal transmission unit 14, the transmit antennas 15-1 to 15-M, a communication distance measurement unit 16, and an information transmission unit 17. The communication distance measurement unit 16 is a distance meter, for example, and measures the distance between the transmit and receive antennas.

Although the transmit antennas 15-1 to 15-M are slightly different from each other in distance to each of the receive antennas 20-1 to 20-N, it is assumed that a distance measured by the communication distance measurement unit 16 is substantially the average distance between the transmit and receive antennas.

The storage unit 12a stores a channel capacity table 122 illustrated in FIG. 11. The channel capacity table 122 is a table that stores the channel capacity actually measured per frequency channel for some predetermined distances.

The channel capacity table 122 has, as items in a longitudinal direction, a frequency channel value item, and subsequently, an "average Ch capacity" item and a "maximum guaranteed transmission scheme" item. A value written into the frequency channel value item is, for example, the center frequency of the frequency channel, and is written in units of [Hz]. Note that, as an example, the channel capacity table 122 indicates six frequency channels having the center frequencies of $f_0$ to $f_5$, with L=6. Note that L is not limited to L=6, and L is an integer of 2 or greater and is a predetermined value.

The channel capacity table 122 has a distance item as an item in a lateral direction. A plurality of distance values predetermined is written into the distance item in units of [m].

The channel capacity actually measured per frequency channel and distance is written into each element specified by two items of the frequency channel item and the distance item. In addition, an average channel capacity value that is the average value of the channel capacities of the frequency channels of $f_0$ to $f_5$ is written into the "average Ch capacity" item per distance.

Information indicating a type of transmission scheme that satisfies a desired bit error rate to be predetermined and provides the maximum transmission capacity within the range of the average channel capacity is written into the "maximum guaranteed transmission scheme" item, for the average channel capacity written into the "average Ch capacity" item corresponding to the "maximum guaranteed transmission scheme" item.

The selection unit 11a refers to the channel capacity table 122 to read the information indicating the type of transmission scheme written into the "maximum guaranteed transmission scheme" that corresponds to the distance between the transmit and receive antennas measured by the communication distance measurement unit 16. The read transmission scheme is a transmission scheme common to all frequency channels.

Furthermore, in the case where the common transmission scheme is applied in each of the frequency channels, the selection unit 11a refers to the channel capacity table 122 to determine whether or not there is a frequency channel in which the bit error rate does not satisfy the desired bit error rate.

The selection unit 11a generates selection information including transmission scheme information common to all the frequency channels. In a case where the selection unit 11a determines that there is a frequency channel in which the bit error rate does not satisfy the desired bit error rate, the selection unit 11a generates the selection information including instruction information indicating that error correction coding and interleaving are to be performed.

The selection unit 11a outputs the generated selection information to the transmission signal generation unit 13a and the information transmission unit 17. The information transmission unit 17 transmits the selection information output by the selection unit 11a to the radio reception device 2a.

The transmission signal generation unit 13a includes a multiplexing unit 32a, error correction coding units 33-1 to 33-M, interleaving units 34-1 to 34-M, and modulation processing units 35-1 to 35-M.

The multiplexing unit 32a separates the transmission data in accordance with multiplexing order indicated in the transmission scheme information included in the selection information output by the selection unit 11a. The multiplexing unit 32a outputs the separated pieces of transmission data to the error correction coding units 33-1 to 33-M.

Each of the error correction coding units 33-1 to 33-M is connected to the selection unit 11a. In a case where the selection information that the error correction coding units 33-1 to 33-M receive from the selection unit 11a includes the instruction information, the error correction coding units 33-1 to 33-M perform the same error correction coding on the separated pieces of transmission data output by the multiplexing unit 32a to the error correction coding units 33-1 to 33-M. The scheme of the error correction coding is, for example, forward error correction coding and the like, and is predefined.

Each of the interleaving units 34-1 to 34-M is connected to the selection unit 11a. In a case where the selection information that the interleaving units 34-1 to 34-M receive from the selection unit 11a includes the instruction information, the interleaving units 34-1 to 34-M perform the same predetermined interleaving on the transmission data output by the corresponding error correction coding units 33-1 to 33-M.

Figure 9:
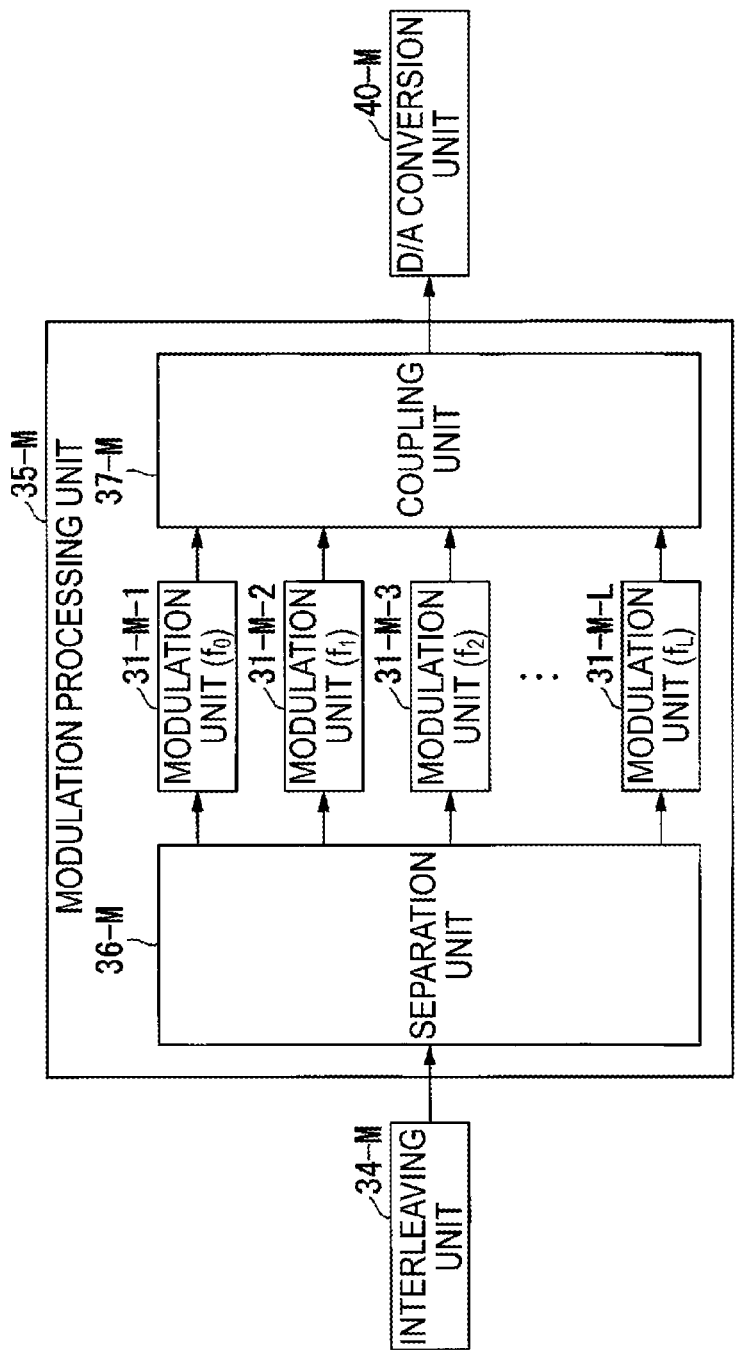
FIG. 9 is a block diagram illustrating an internal configuration of a modulation processing unit, and a connection relationship between modulation processing unit and each of an interleaving unit and a D/A conversion unit according to the second embodiment.

The modulation processing units 35-1 to 35-M have similar internal configurations. For example, FIG. 9 illustrates, as an example, an internal configuration of the modulation processing unit 35-M, and a connection relationship between the modulation processing unit 35-M and each of the interleaving unit 34-M and the D/A conversion unit 40-M. The modulation processing unit 35-M includes a separation unit 36-M, L modulation units 31-M-1 to 31-M-L, and a coupling unit 37-M. Note that the internal configurations of the modulation processing units 35-1 to 35-(M-1) are those in which the reference sign M in FIG. 9 is replaced with 1 to (M-1), respectively.

Here, L represents an integer of 2 or greater, as in the first embodiment. In the first embodiment, a plurality of frequency channels to be used are selected from among all the frequency channels available undersea, so L may be less than the number of all frequency channels available undersea. In contrast, in the second embodiment, all the frequency channels available undersea are used, so L matches the number of all frequency channels available undersea. Note that the number of all frequency channels available undersea is predetermined.

The separation unit 36-M separates the transmission data output by the interleaving unit 34-M into L pieces. The separation unit 36-M outputs the separated pieces of transmission data to the respective modulation units 31-M-1 to 31-M-L.

For the respective modulation units 31-M-1 to 31-M-L, the different center frequencies of the frequency channels are defined in advance as the modulation frequencies. For example, the frequency $f_0$ and the frequency $f_L$ are defined for the modulation unit 31-M-1 and the modulation unit 31-M-L, respectively. The modulation units 31-M-1 to 31-M-L modulate the transmission data output by the separation unit 36-M to each of the modulation units 31-M-1 to 31-M-L in accordance with the modulation scheme common to all the frequency channels indicated in the transmission scheme information included in the selection information output by the selection unit 11a, and the predetermined modulation frequency, and generate transmission signals.

The coupling unit 37-M couples the transmission signals generated and output by the respective modulation units 31-M-1 to 31-M-L, and outputs the coupled signals to the D/A conversion unit 40-M.

The radio reception device 2a illustrated in FIG. 10 includes the receive antennas 20-1 to 20-N, the A/D conversion units 21-1 to 21-N, the demodulation unit 22, an information reception unit 25, a deinterleaving unit 26, and an error correction decoding unit 27.

The information reception unit 25 receives the selection information transmitted by the information transmission unit 17 in the radio transmission device 1a. The information reception unit 25 outputs the received selection information to the demodulation unit 22, the deinterleaving unit 26, and the error correction decoding unit 27. Note that the transmission capacity required to transmit information from the information transmission unit 17 to the information reception unit 25 may be a low transmission capacity. Furthermore, communication between the information transmission unit 17 and the information reception unit 25 is performed by, for example, radio communication through the sea with good communication quality, or by radio communication of electromagnetic waves propagating through air with good communication quality.

In a case where the selection information output by the information reception unit 25 includes the instruction information, the deinterleaving unit 26 performs deinterleaving on the reception data output by the demodulation unit 22. Here, the deinterleaving scheme is a deinterleaving scheme corresponding to the interleaving scheme carried out by the interleaving units 34-1 to 34-M and is predetermined.

In the case where the selection information output by the information reception unit 25 includes the instruction information, the error correction decoding unit 27 performs error correction decoding on the reception data output by the deinterleaving unit 26. Here, it is assumed that the error correction decoding scheme is an error correction decoding scheme corresponding to the error correction coding scheme performed by the error correction coding units 33-1 to 33-L and is predefined.

Process of Radio Communication System in Second Embodiment

FIG. 12 is a sequence diagram illustrating a flow of a process by the radio communication system Sa according to the second embodiment. In the following, a description is given assuming that the number L of all frequency channels is "6". In the following, the process is described in which the selection unit 11a calculates the channel capacity per frequency channel rather than calculating the average channel capacity which is the average value of the channel capacities and utilizes the channel capacity table 122.

The communication distance measurement unit 16 measures the distance between the transmit and receive antennas (step Sta1). Here, assume that the distance between the transmit and receive antennas measured by the communication distance measurement unit 16 is "$X_3$". The communication distance measurement unit 16 outputs information of the measured distance between the transmit and receive antennas to the selection unit 11a.

The selection unit 11a refers to the channel capacity table 122 stored by the storage unit 12a to read the information indicating the type of transmission scheme written into the "maximum guaranteed transmission scheme" that corresponds to the distance between the transmit and receive antennas output by the communication distance measurement unit 16. Here, as illustrated in FIG. 11, the selection unit 11a reads the transmission scheme B, and selects the read transmission scheme B as the transmission scheme common to all the frequency channels (step Sta2).

The selection unit 11a reads the transmission scheme information corresponding to the selected transmission scheme B from the storage unit 12a. Here, assume that multiplexing order included in the transmission scheme information for the transmission scheme B is "M".

The selection unit 11a refers to a transmission scheme lookup table 121a-1 and refers to the channel capacity table 122 to determine whether or not there is a frequency channel in which the bit error rate does not satisfy the desired bit error rate in each frequency channel for the selected transmission scheme B (step Sta3).

In a case where the selection unit 11a determines that there is a frequency channel in which the bit error rate does not satisfy the desired bit error rate (step Sta3, Yes), the selection unit 11a generates the selection information including the read transmission scheme information and the instruction information (step Sta4). On the other hand, in a case where the selection unit 11a determines that there is no frequency channel in which the bit error rate does not satisfy the desired bit error rate (step Sta3, No), the selection unit 11a generates the selection information including the read transmission scheme information (step Sta5).

The selection unit 11a reads, from the channel capacity table 122, the "average Ch capacity" in an item of the distance $X_3$, that is, a value of the average channel capacity "8.7". In a case where the selection unit 11a determines that any of the values of the channel capacities in the items of the frequency channels "$f_0$" to "$f_5$" of the distance $X_3$ in the channel capacity table 122 is less than "8.7", the selection unit 11a determines in step Sta3 that there is a frequency channel in which the bit error rate does not satisfy the desired bit error rate. On the other hand, in a case where the selection unit 11a determines that none of the values of the channel capacities in the items of the frequency channels "$f_0$" to "$f_5$" of the distance $X_3$ in the channel capacity table 122 is less than "8.7", the selection unit 11a determines in step Sta3 that there is no frequency channel in which the hit error rate does not satisfy the desired hit error rate. Here, as illustrated in FIG. 11, the values of the channel capacities of the frequency channels $f_0$ and $f_5$ are less than "8.7", so the selection unit 11a determines that there is a frequency channel in which the bit error rate does not satisfy the desired bit error rate. Accordingly, the selection unit 11a generates the selection information including the read transmission scheme information for the transmission scheme B and the instruction information (steps Sta4).

The selection unit 11a outputs the generated selection information to the transmission signal generation unit 13a and the information transmission unit 17. The information transmission unit 17 transmits the selection information to the information reception unit 25 in the radio reception device 2a (step Sta6).

The information reception unit 25 receives the selection information transmitted by the information transmission unit 17. The information reception unit 25 outputs the received selection information to the demodulation unit 22, the deinterleaving unit 26, and the error correction decoding unit 27. The demodulation unit 22 in the radio reception device 2 takes in the selection information output by the information reception unit 25 and configures a demodulation scheme corresponding to the modulation scheme common to all the frequency channels included in the selection information (step Sra1).

The multiplexing unit 32a separates the transmission data into M pieces in accordance with the multiplexing order "M" indicated in the transmission scheme information included in the selection information output by the selection unit 11a. The multiplexing unit 32a outputs M separated pieces of transmission data to the respective error correction coding units 33-1 to 33-M.

In a case where the selection information that the error correction coding units 33-1 to 33-M receive from the selection unit 11a includes the instruction information, the error correction coding units 33-1 to 33-M perform the same predetermined error correction coding on the transmission data output by the multiplexing unit 32a. In a case where the selection information does not include the instruction information, the error correction coding units 33-1 to 33-M output the transmission data as it is output by the multiplexing unit 32a. Here, the selection information includes the instruction information, so the error correction coding units 33-1 to 33-M perform error correction coding on the transmission data.

In a case where the selection information that the interleaving units 34-1 to 34-M receive from the selection unit 11a includes the instruction information, the interleaving units 34-1 to 34-M perform the same predetermined interleaving on the transmission data output by the corresponding error correction coding units 33-1 to 33-M. In a case where the selection information does not include the instruction information, the interleaving units 34-1 to 34-M output the transmission data as it is output by the corresponding error correction coding units 33-1 to 33-M. Here, the selection information includes the instruction information, so the interleaving units 34-1 to 34-M perform interleaving on the transmission data (step Sta7).

The modulation processing units 35-1 to 35-M take in the transmission data output by the corresponding interleaving units 34-1 to 34-M. For example, in a case of the modulation processing unit 35-M, the separation unit 36-M takes in the transmission data output by the interleaving unit 34-M and separates the taken transmission data into L pieces. Each of the modulation units 31-M-1 to 31-M-L modulates the pieces of transmission data in accordance with the modulation scheme for the transmission scheme B common to all the frequency channels included the selection information received from the selection unit 11a, and the modulation frequencies $f_0$ to $f_5$ predetermined for each of the modulation units. The coupling unit 37-M takes in the pieces of transmission data modulated and output by the respective modulation units 31-M-1 to 31-M-L, couples the taken pieces of transmission data, and outputs the coupled transmission data to the D/A conversion unit 40-M (step Sta8). The modulation processing units 35-1 to 35-(M-1) also perform the processes similar to the modulation processing unit 35-M.

The respective D/A conversion units 40-1 to 40-M convert the digital transmission signals output by the corresponding modulation processing units 35-1 to 35-M into analog transmission signals (step Sta9). The D/A conversion units 40-1 to 40-M transmit the converted analog transmission signals through the transmit antennas 15-1 to 15-M to the radio reception device 2a (step Sta10).

The receive antennas 20-1 to 20-N receive the radio signals transmitted by the radio transmission device 1 and outputs the received radio signals as reception signals (step Sra2). The A/D conversion units 21-1 to 21-N convert the analog reception signals output by the receive antennas 20-1 to 20-N connected to the respective A/D conversion units 21-1 to 21-N, into digital reception signals (step Sra3).

The demodulation unit 22 takes in the digital reception signals output by the A/D conversion units 21-1 to 21-N and demodulates the taken reception signals in accordance with the demodulation scheme configured in step Sra1 to generate reception data. The demodulation unit 22 outputs the generated reception data to the deinterleaving unit 26 (step Sra4).

In a case where the selection information that the deinterleaving unit 26 receives, from the information reception unit 25, in step Sra1 includes the instruction information, the deinterleaving unit 26 performs predetermined deinterleaving on the reception data output by the demodulation unit 22 and outputs the deinterleaved data. In a case where the selection information does not include the instruction information, the deinterleaving unit 26 outputs the reception data as it is output by the demodulation unit 22. Here, because the selection information includes the instruction information, the deinterleaving unit 26 performs deinterleaving on the reception data output by the demodulation unit 22 and outputs the deinterleaved data.

In a case where the selection information that the error correction decoding unit 27 receives from the information reception unit 25 in step Sra1 includes the instruction information, the error correction decoding unit 27 performs predetermined error correction decoding on the reception data output by the deinterleaving unit 26. In a case where the selection information does not include the instruction information, the error correction decoding unit 27 outputs the reception data as it is output by the deinterleaving unit 26. Here, because the selection information includes the instruction information, the error correction decoding unit 27 performs error correction decoding on the reception data output by the deinterleaving unit 26 and outputs the error correction decoded data.

The radio transmission device 1a repeatedly performs the processes in steps Stat to Sta10, and the radio reception device 2a repeatedly performs the processes in steps Sra1 to Sra5. As a result, even in a case where a ship provided with the radio transmission device 1a and a ship provided with the radio reception device 2a move in any directions, and thereby, the distance between the transmit and receive antennas is changed, the communication distance measurement unit 16 in the radio transmission device 1a continues to measure the distance between the transmit and receive antennas. As a result, the selection unit 11a in the radio transmission device 1a can select an appropriate transmission scheme common to all the frequency channels depending on the distance between the transmit and receive antennas.

Note that in the process in steps Sta3 illustrated in FIG. 12, the selection unit 11a determines whether there is a frequency channel in which the desired bit error rate is not satisfied with reference to the value of the average channel capacity in the "average Ch capacity" item in the channel capacity table 122. In this manner, if the average value is used as a reference, there is a frequency channel in which the desired bit error rate is not satisfied unless the values of the channel capacities of all the frequency channels are not equal, and so, error correction coding and interleaving are performed. In a case where a frequency at which error correction coding or interleaving processing is performed is suppressed, for example, the selection unit 11a may use a value obtained by subtracting a certain value from the average channel capacity, as a reference value for the determination, rather than using a value of the average channel capacity as a reference value for the determination.

In the configuration according to the second embodiment described above, the radio transmission device 1a includes the communication distance measurement unit 16 to measure the distance between the transmit and receive antennas. The selection unit 11a in the radio transmission device 1a selects the average channel capacity obtained by averaging the channel capacities per frequency channel indicating the orthogonality between the transmit antennas 15-1 to 15-N and the receive antennas 20-1 to 20-N depending on the distance between the transmit and receive antennas measured by the communication distance measurement unit 16, and the modulation scheme common to all the frequency channels that satisfies the desired bit error rate to be predetermined. The transmission signal generation unit 13a separates the transmission data into pieces the number of which is the number of all frequency channels. Next, the transmission signal generation unit 13a outputs transmission signals obtained by modulating the separated pieces of transmission data in accordance with the selected common modulation scheme and multiplexing the modulated pieces of data by multiplexing order.

By doing so, in the radio communication system Sa according to the second embodiment, it is possible, with all the frequency channels being used, to maintain the formation of the parallel transmission paths in the spatial multiplexing transmission and increase the transmission capacity even when the distance between the transmit and receive antennas changes in the line-of-sight environment. Further, in the second embodiment, the radio transmission device 1a is configured to measure the distance between the transmit and receive antennas by the radio transmission device 1a itself, unlike the first embodiment in which the radio transmission device 1a receives, from the receiving side, the estimation information including the distance between the transmit and receive antennas and the angle indicating the direction of arrival of the radio signal. Therefore, the time required to estimate the estimation information and the time required to transmit the estimation information are not required. Furthermore, instead of these times, only the time for the communication distance measurement unit 16 to measure the distance is required, and thus, the time until the radio signal is transmitted can be shortened in a case where the distance between the transmit and receive antennas is changed.

In addition, the selection unit 11a in the radio transmission device 1a uses all the frequency channels rather than selecting the frequency channel to be used, so the degree of averaging the characteristics of the channel capacities different every frequency channel is higher than that in the first embodiment. In addition, because the transmission scheme common to all the frequency channels is selected, the time required to select the transmission scheme can also be shortened. However, the transmission scheme common to all the frequency channels is selected in the second embodiment. As such, the available channel capacity may be less than that of the radio communication system S according to the first embodiment.

Furthermore, in the second embodiment, because all the frequency channels are used and the transmission scheme common to all the frequency channels is adopted, the transmission scheme optimal for each frequency channel is not adopted. As such, a frequency channel in which the bit error rate does not satisfy the desired bit error rate may occur. For these frequency channels, the bit error rate is compensated by the error correction coding units 33-1 to 33-L performing error correction coding to add redundancy or by the interleaving units 34-1 to 34-L performing interleaving to prevent a burst error from occurring. Therefore, the configuration according to the second embodiment also enables the radio communication with the high channel capacity.

Figure 13:
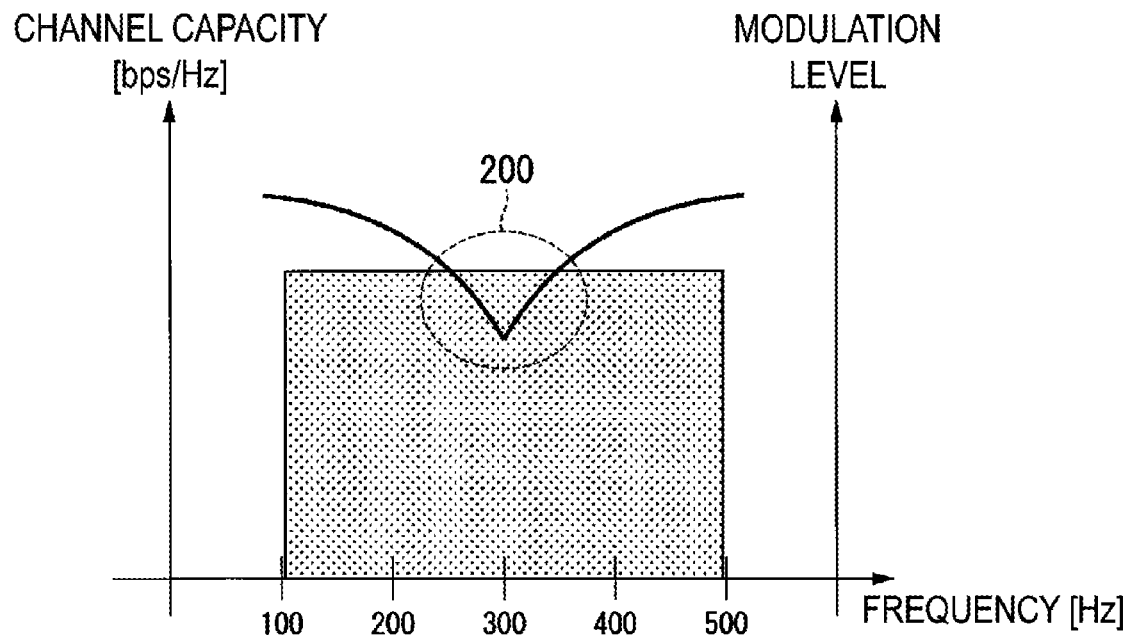
FIG. 13 is a graph (part 1) illustrating a relationship between a channel capacity and modulation level per frequency channel in a case where a common transmission scheme is assigned to all frequency channels according to the second embodiment.
Figure 14:
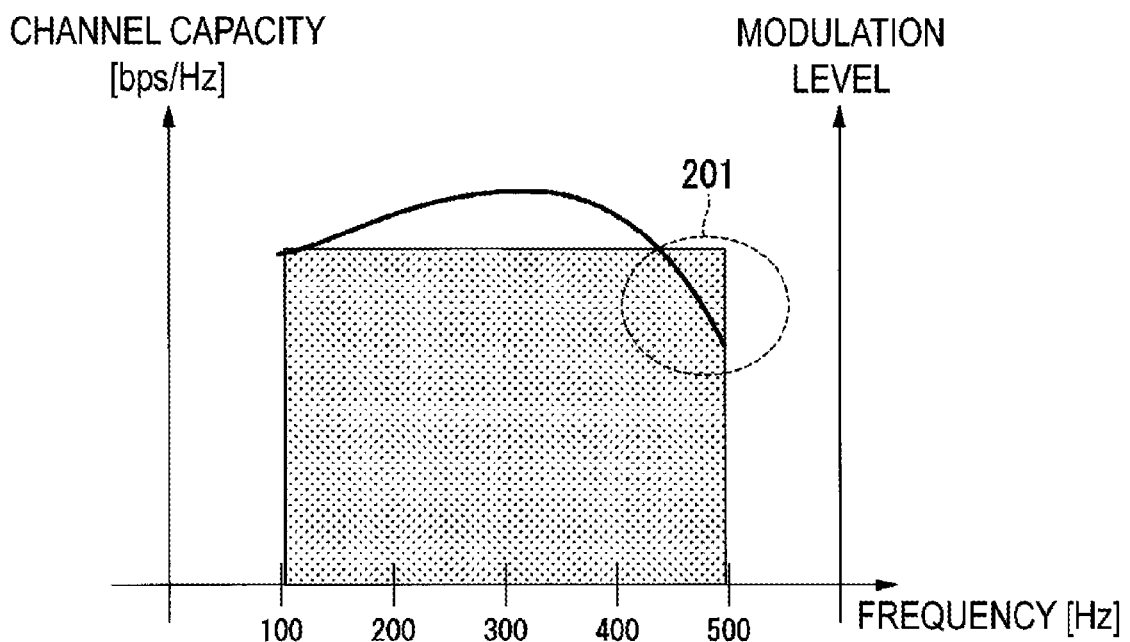
FIG. 14 is a graph (part 2) illustrating a relationship between a channel capacity and modulation level per frequency channel in the case where the common transmission scheme is assigned to all the frequency channels according to the second embodiment.

For example, FIG. 13 is a graph illustrating a relationship between the channel capacity and the modulation level in the modulation scheme per frequency channel in a case where the distance between the transmit and receive antennas is "10 m". FIG. 14 is a graph illustrating a relationship between the channel capacity and the modulation level in the modulation scheme per frequency channel in a case where the distance between the transmit and receive antennas is "15 m". In each of FIGS. 13 and 14, a horizontal axis represents a frequency value.

In FIGS. 13 and 14, a line of change characteristics illustrated by a solid line indicates a change in the channel capacity, and a bar graph indicates the modulation level. In the second embodiment, the transmission scheme common to all the frequency channels is adopted, so the modulation level is identical in all the frequency channels.

In the graph in FIG. 13, referring to the change characteristics of the channel capacity, the channel capacity is high near the frequencies of "100 Hz" and "500 Hz" on both ends. Compared to FIG. 4 illustrated in the first embodiment, in the second embodiment, the modulation level is not appropriate near the frequencies of "100 Hz" and "500 Hz" on both ends, so there is a spare channel capacity.

In FIG. 13, the channel capacity is low near the center of the frequency of "300 Hz" at a portion denoted by a reference numeral 200. As such, the frequency channel in the portion denoted by the reference numeral 200 is high in the bit error rate, and thus, the compensation by error correction coding and interleaving is performed to reduce the hit error rate of the overall transmission data to perform compensation.

Referring to the change characteristics of the channel capacity in the graph in FIG. 14, the channel capacity is high near the frequency of "300 Hz". Compared to FIG. 5 illustrated in the first embodiment, in the second embodiment, the modulation level is not appropriate near the frequency of "300 Hz", so there is a spare channel capacity.

In FIG. 14, the channel capacity is greatly reduced near "500 Hz" denoted by a reference numeral 201. As such, the frequency channel in the portion denoted by the reference numeral 201 is high in the bit error rate, and thus, the compensation by error correction coding and interleaving is performed to reduce the bit error rate of the overall transmission data to perform compensation.

Figure 15:
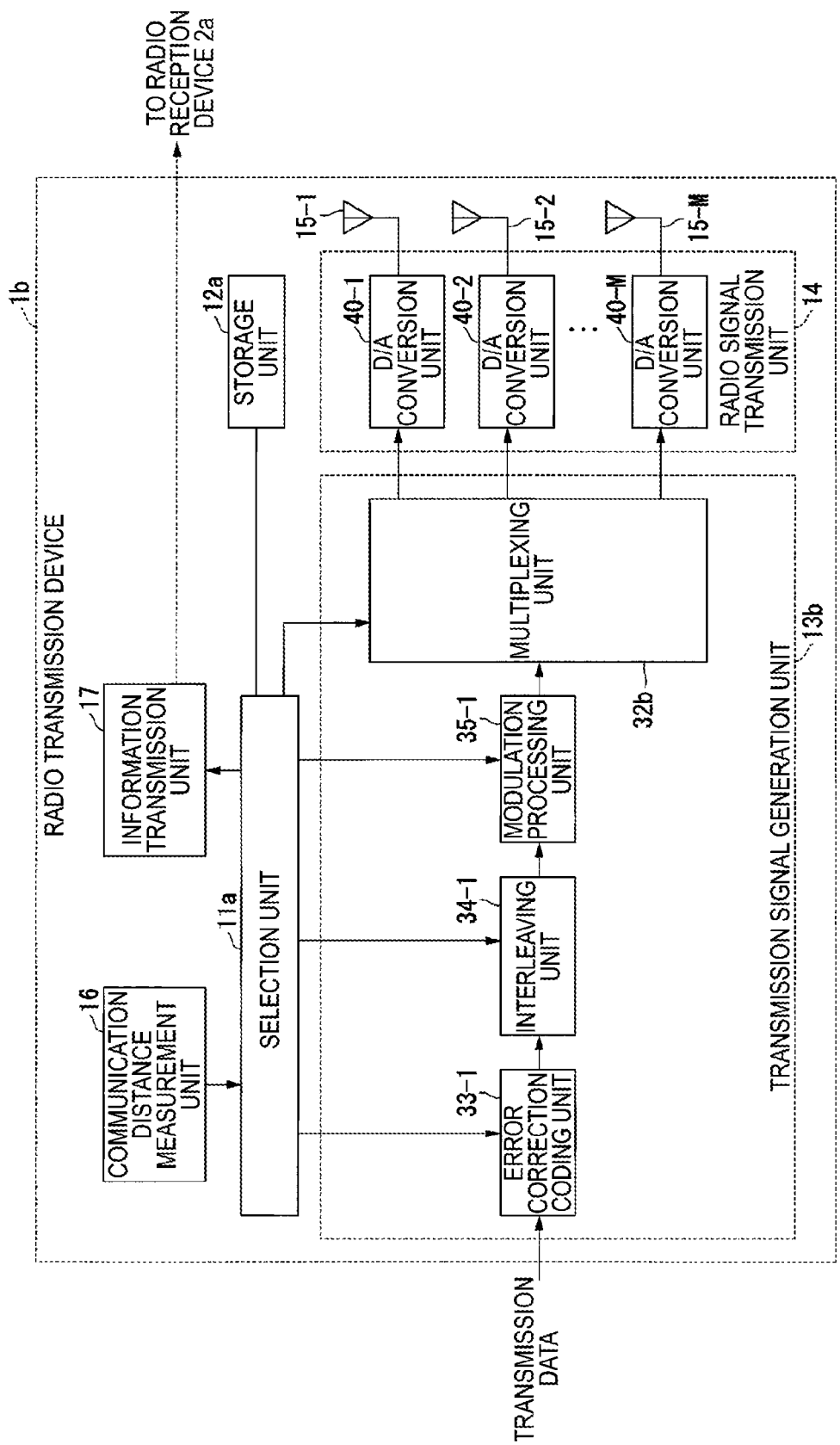
FIG. 15 is a block diagram illustrating another configuration example of the radio transmission device according to the second embodiment.
Figure 16:
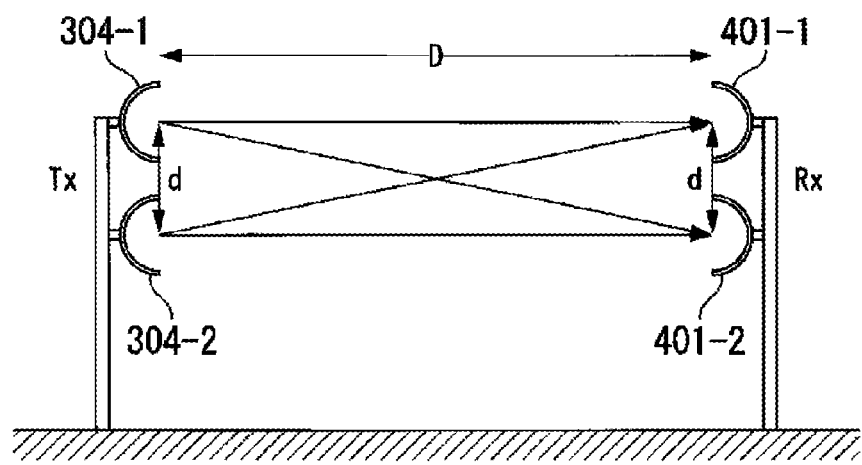
FIG. 16 is a diagram illustrating a geometric configuration of a transmit antenna and a receive antenna in the LoS-MIMO technique.
Figure 17:
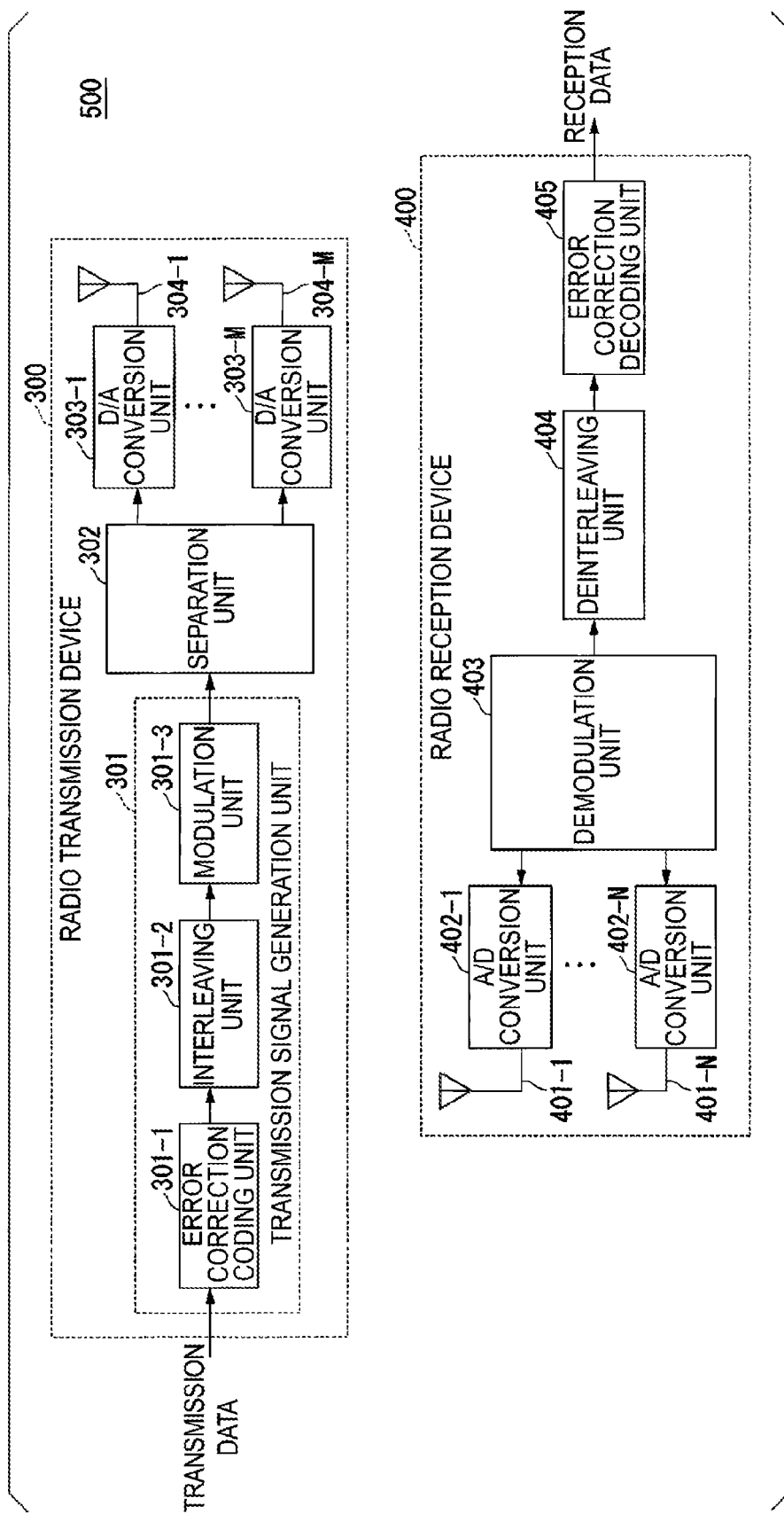
FIG. 17 is a block diagram illustrating a configuration of a known radio communication system using the LoS-MIMO technique.
Figure 18:
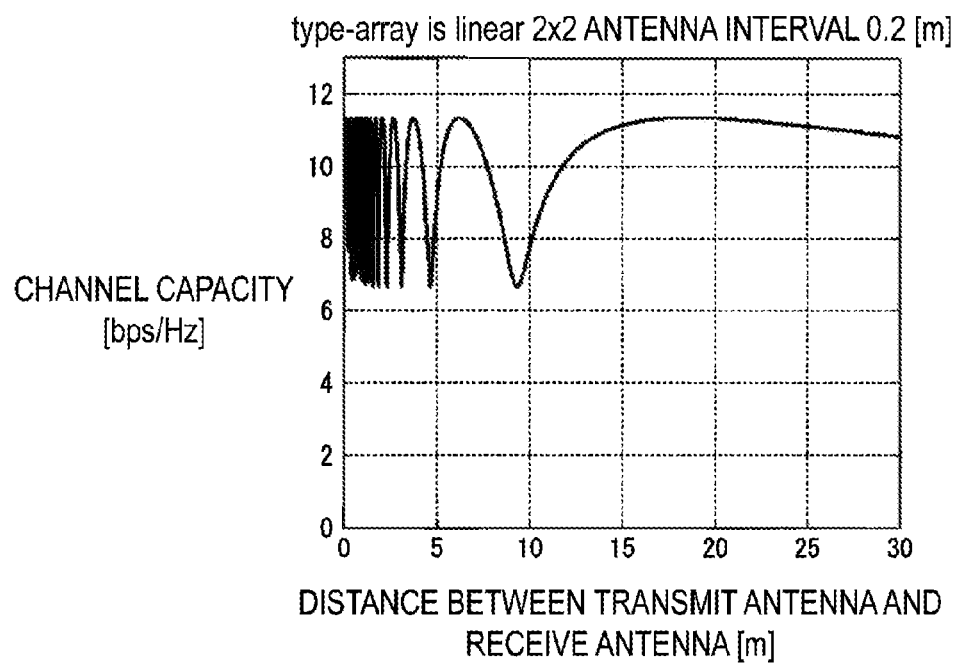
FIG. 18 is a graph illustrating distance characteristics of channel capacity in a case of using the LoS-MIMO technique.

Note that, as another example of the configuration according to the second embodiment, a radio transmission device 1b illustrated in FIG. 15 may be applied instead of the radio transmission device 1a of the second embodiment. A transmission signal generation unit 13b in the radio transmission device 1b includes an error correction coding unit 33-1, an interleaving unit 34-1, a modulation processing unit 35-1, and a multiplexing unit 32b. The transmission signal generation unit 13b performs error correction coding, interleaving, and modulation for all the frequency channels on the transmission data in accordance with the selection information output by the selection unit 11a, and thereafter, the multiplexing unit 32b separates the transmission signal in accordance with the multiplexing order included in the selection information and outputs each of the separated transmission signals to the D/A conversion units 40-1 to 40-M. Note that error correction coding and interleaving are performed in a case where the selection information includes the instruction information, and is not performed in a case where the selection information does not include the instruction information.

Similar to the first embodiment, in the second embodiment also, in a case where the multiplexing order included in the transmission scheme information is smaller than M that is the number of transmit antennas 15-1 to 15-M, a combination of the transmit antennas 15-1 to 15-M used to transmit the radio signal is predetermined. For example, in a case where the multiplexing order is "2", it is predetermined to use both ends, that is, the transmit antenna 15-1 and the transmit antenna 15-M, between which interval is the farthest and from which radio signals streams are likely to be independent. Information on the combination of the transmit antennas 15-1 to 15-M depending on the multiplexing order is pre-stored in a storage area in the multiplexing units 32a and 32b, and the multiplexing units 32a and 32b select the output destinations depending on multiplexing order. In the case of the multiplexing unit 32a, when the multiplexing order is "2", the multiplexing unit 32a outputs the separated pieces of transmission data to the error correction coding units 33-1 and 33-M. In the case of the multiplexing unit 32b, when the multiplexing order is "2", the multiplexing unit 32b outputs the separated pieces of transmission data to the D/A conversion units 40-1 and 40-M.

Further, in the second embodiment described above, in the case where the selection information generated by the selection unit 11a includes the instruction information, both error correction coding and interleaving are performed. However, in the second embodiment, only either one of error correction coding or interleaving may be performed. In this case, the selection information may include separate pieces of instruction information so that the instruction information for the error correction coding units 33-1 to 33-M and the instruction information for the interleaving units 34-1 to 34-M can be distinguished. The instruction information may include information indicating the type of error correction coding scheme and the type of interleaving scheme. In this way, the error correction coding units 33-1 to 33-M and the interleaving units 34-1 to 34-M, and the error correction decoding unit 27 and the deinterleaving unit 26 receiving the instruction information can perform the processes by switching the schemes in accordance with the instruction information.

Further, in the second embodiment described above, the channel capacity value in the channel capacity table 122 is an actually measured value, but the selection unit 11a may select a transmission scheme with the desired bit error rate taken into consideration by using the equations (2) to (6) described in the first embodiment to calculate the channel capacity. In this case, the selection unit 11a calculates the channel capacity per frequency channel on the basis of the SNR that is determined from the distance measured by the communication distance measurement unit 16 and the transmission power in transmission by the radio transmission device 1a. The selection unit 11a calculates the average channel capacity, which is the average value of the calculated channel capacities, and selects, for the calculated average channel capacity, a transmission scheme that satisfies the desired bit error rate and has the closest transmission rate as the transmission scheme common to all the frequency channels.

Additionally, in the first and second embodiments described above, in a case where M=2 and the radio transmission devices 1 and 1a include only two transmit antennas 15-1 and 15-2, the multiplexing order is fixed to "2". In this case, because the multiplexing units 32, 32a, and 32b separate all of the transmission signals into two, the transmission scheme information does not include multiplexing order.

In addition, in the first and second embodiments described above, in the description described using the first to third transmission rate thresholds, the first and second bit error rate thresholds, and the channel capacity thresholds, determinations using an inequality sign or an inequality sign with equal sign are made. However, the present invention is not limited to those embodiments, and determinations such as "whether or not a value is greater than a threshold", "whether or not a value is less than a threshold", "whether or not a value is equal to or greater than a threshold", and "whether or not a value is equal to or less than a threshold" are merely examples. Depending on how a threshold is set, the above determinations may be respectively replaced by "whether or not a value is equal to or greater than a threshold", "whether or not a value is equal to or less than a threshold", "whether or not a value is greater than a threshold", and "whether or not a value is less than a threshold". For example, the determination whether or not to satisfy the "desired bit error rate" in step St2 in FIG. 3 in the first embodiment is made depending on whether or not a bit error rate is less than the first bit error rate threshold, but may be interpreted that the determination is made depending on whether or not a bit error rate is equal to or less than the first bit error rate threshold by changing the value of the first bit error rate threshold. The threshold used in the determination is also merely an example, and a different threshold may be used for each threshold.

In the first and second embodiments described above, the channel capacity is used as an index value indicating the orthogonality, but any value other than the channel capacity may be used as long as the index value indicates the orthogonality.

The radio transmission devices 1, 1a, and 1b, and the radio reception devices 2 and 2a in the above-described embodiments may be implemented with computers. In such a case, it may be implemented by recording a program for implementing these functions in a computer-readable recording medium, causing a computer system to read the program recorded in the recording medium, and executing the program. Note that the "computer system" as used herein includes an OS and hardware such as a peripheral device. In addition, the "computer-readable recording medium" refers to a portable medium such as a flexible disk, a magneto-optical disk, a read only memory (ROM), and a compact disk read only memory (CD-ROM), and a storage device such as a hard disk built into a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is a volatile memory inside a computer system that functions as a server or a client in the above-described case. The above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

The embodiments of the present invention have been described above in detail with reference to the drawings. However, specific configurations are not limited to those embodiments, and include any design or the like within the scope not departing from the gist of the present invention.

REFERENCE SIGNS LIST 1, 1a, 1b Radio transmission device
10 Information transmission/reception unit
11, 11a Selection unit
12, 12a Storage unit
13, 13a, 13b Transmission signal generation unit
14 Radio signal transmission unit
15-1 to 15-M Transmit antenna
16 Communication distance measurement unit
17 Information transmission unit
2, 2a Radio reception device
20-1 to 20-N Receive antenna
21-1 to 21-N A/D conversion unit
22 Demodulation unit
23 Estimation unit
24 Information transmission/reception unit
25 Information reception unit
26 Deinterleaving unit
27 Error correction decoding unit 30 Separation unit
31-1 to 31-L Modulation unit
32, 32a, 32b Multiplexing unit
33-1 to 33-M Error correction coding unit
34-1 to 34-M Interleaving unit
35-1 to 35-M Modulation processing unit
36-M Separation unit
37-M Coupling unit
40-1 to 40-M D/A conversion unit

The invention claimed is:

1. A radio communication system comprising:
a radio transmission device including a plurality of transmit antennas; and
a radio reception device including a plurality of receive antennas,
wherein the radio reception device includes
a demodulator configured to demodulate a reception signal received by each of the plurality of receive antennas in accordance with a demodulation scheme corresponding to a modulation scheme selected by the radio transmission device, to generate reception data, and
an estimator configured to estimate, based on the reception signal, a distance between a transmit antenna of the plurality of transmit antennas and the receive antenna and an angle indicating a direction of arrival of a radio signal, and
the radio transmission device includes
a selector configured to select a frequency channel to be used based on an index value per frequency channel indicating orthogonality between the transmit antenna and the receive antenna, the distance between the transmit antenna and the receive antenna estimated by the estimator, the angle indicating the direction of arrival of the radio signal estimated by the estimator, and a desired bit error rate to be predetermined, and select the modulation scheme for providing a maximum transmission capacity per the selected frequency channel,
a transmission signal generator configured to separate transmission data into a plurality of pieces of transmission data the number of which corresponds to the number of frequency channels, modulate each of the plurality of pieces of transmission data separated in accordance with the selected modulation scheme, and output a transmission signal obtained by multiplexing, with a multiplexing order, each of the plurality of pieces of transmission data that are modulated, the multiplexing order indicating the number of transmit antennas of the plurality of transmit antennas to be used; and
a radio signal transmitter configured to transmit a plurality of the transmission signals,
wherein each of the demodulator, the estimator, the selector, the transmission signal generator and the radio signal transmitter is implemented by:
i) computer executable instructions executed by at least one processor,
ii) at least one circuitry or
iii) a combination of the computer executable instructions executed by at least one processor and at least one circuitry.

2. The radio communication system according to claim 1, wherein
the selector selects the modulation scheme for providing the maximum transmission capacity and the multiplexing order per the selected frequency channel to be used.

3. The radio communication system according to claim 1, wherein
the selector selects the frequency channel to be used, based on a desired transmission rate to be predetermined, in addition to the index value per frequency channel indicating the orthogonality between the transmit antenna and the receive antenna, the distance between the transmit antenna and the receive antenna estimated by the estimator, the angle indicating the direction of arrival of the radio signal, and the desired bit error rate to be predetermined.

4. A radio communication method performed by a radio transmission device including a plurality of transmit antennas and a radio reception device including a plurality of receive antennas, the radio communication method comprising:
by the radio reception device,
demodulating a reception signal received by each of the plurality of receive antennas in accordance with a demodulation scheme corresponding to a modulation scheme selected by the radio transmission device, to generate reception data;
estimating, based on the reception signal generated, a distance between a transmit antenna of the plurality of transmit antennas and the receive antenna and an angle indicating a direction of arrival of a radio signal, and
by the radio transmission device,
selecting a frequency channel to be used based on an index value per frequency channel indicating orthogonality between the transmit antenna and the receive antenna, the distance between the transmit antenna and the receive antenna estimated by the radio reception device, the angle indicating the direction of arrival of the radio signal estimated by the radio reception device, and a desired bit error rate to be predetermined and selecting the modulation scheme for providing a maximum transmission capacity per the selected frequency channel;
separating transmission data into a plurality of pieces of transmission data the number of which corresponds to the number of frequency channels;
modulating each of the plurality of pieces of transmission data separated in accordance with the selected modulation scheme;
outputting a transmission signal obtained by multiplexing, with a multiplexing order, each of the plurality of pieces of transmission data that are modulated, the multiplexing order indicating the number of transmit antennas of the plurality of transmit antennas to be used; and
transmitting a plurality of the transmission signals that are output.

* * * * *